(12) United States Patent
Metcalf

(10) Patent No.: US 6,669,346 B2
(45) Date of Patent: Dec. 30, 2003

(54) LARGE-AUDIENCE, POSITIONABLE IMAGING AND DISPLAY SYSTEM FOR EXHIBITING PANORAMIC IMAGERY, AND MULTIMEDIA CONTENT FEATURING A CIRCULARITY OF ACTION

(76) Inventor: Darrell J. Metcalf, 905 N. Oak Ave., Fillmore, CA (US) 93015

( * ) Notice: Subject to any disclaimer, the term of this patent is extended or adjusted under 35 U.S.C. 154(b) by 0 days.

(21) Appl. No.: 09/853,915

(22) Filed: May 12, 2001

(65) Prior Publication Data
US 2001/0040671 A1 Nov. 15, 2001

Related U.S. Application Data
(60) Provisional application No. 60/204,024, filed on May 15, 2000.

(51) Int. Cl.[7] .................. G03B 21/26; G03B 21/00; G03B 31/00; G03B 37/00; G09B 19/16
(52) U.S. Cl. .................. 353/94; 353/122; 353/15; 353/70; 352/69; 352/70; 352/34; 434/40; 434/44
(58) Field of Search .................. 353/69, 94, 70, 353/122, 15, 18, 19; 359/13, 14; 434/40, 44; 352/69, 70, 34

(56) References Cited

U.S. PATENT DOCUMENTS

| | | | | |
|---|---|---|---|---|
| 4,885,878 A | * | 12/1989 | Wuu | 52/6 |
| 5,657,073 A | * | 8/1997 | Henley | 348/38 |
| 5,703,961 A | * | 12/1997 | Rogina et al. | 382/154 |
| 6,202,666 B1 | * | 3/2001 | Rehbein | 135/115 |
| 6,253,494 B1 | * | 7/2001 | Shaffron | 52/7 |
| 6,280,341 B1 | * | 8/2001 | Hayashi | 472/61 |

* cited by examiner

Primary Examiner—Russell Adams
Assistant Examiner—Melissa J Koval

(57) ABSTRACT

A panoramic imaging and display system for the imaging and displaying of visual-media content, comprising a screen configured for the display of panoramic imagery, having an interior surface-perimeter and an exterior surface-perimeter, wherein each of said surface-perimeters are substantially contiguous in appearance and are sized and shaped to have a display area on which, substantially contiguous panoramic visual-media content and segmented visual-media content can be imaged. The system provides support and positioning of the display to at least one height relative to a viewing audience to provide circumnavigable viewing, and a multitude of vantage points from which to view at least one of the surface-perimeters of the panoramic display. Embodiments of the system can have an array of speakers positioned around a perimeter of the system's screen as a sound-system providing a panning of audible sound which can be synchronized with the movement of objects seen moving on the screen.

30 Claims, 9 Drawing Sheets

LARGE-AUDIENCE, POSITIONABLE IMAGING AND DISPLAY SYSTEM FOR EXHIBITING PANORAMIC IMAGERY, AND MULTIMEDIA CONTENT FEATURING A CIRCULARITY OF ACTION

This is a non-provisional application which relies on provisional patent application No. 60/204,024 filed on May 15, 2000.

FIELD OF THE INVENTION

This invention relates generally to large-audience, positionable imaging and display systems for the imaging and displaying of visual-media content. More particularly, it pertains to large-audience imaging and display systems incorporating image-projection, image-processing, and image-displaying, apparatus suitable for the communication, control and exhibition of live and/or pre-recorded visual-media content such as analog or digital video, film, slides, computer-generated panoramic content graphics and the like.

SUMMARY OF THE INVENTION

In particular, the large-audience, positionable imaging and display system comprises substantially cylindrical, arced, or dome-shaped, screen-displays that are each configured for display of panoramic imagery and in some embodiments are also configured for networked interactivity, or for the viewing and/or participant interaction with multimedia content featuring a circularity of action (e.g. panoramic games, races, or battles).

In one embodiment the large-audience screen-displays are positioned to be exteriorly viewable, and in another embodiment the large-audience screen-displays provide a dual-perspective viewing such that screen-content is both exteriorly and interiorly viewable from any one of a variety of vantage points beyond an outer diameter of the screen(s). In either embodiment, the large-audience screen-displays of the image delivery and display system can exhibit pre-recorded, computer-generated, and image-processed image content (optionally including synchronous audio). The screen-displays also exhibit live, multi-channel, or multiplexed, panoramic content (such as the video and audio received from a live multi-camera broadcast). The system can be configured having sufficient height and width to facilitate either close proximity viewing or viewing at a distance, and in the latter case, can readily be employed in arenas, stadiums and other large audience venues, including venues in indoor or outdoor settings.

BACKGROUND OF THE INVENTION

Since the inception of motion pictures, and with more recent developments in projection systems for live and pre-recorded images, various screen-displays have been utilized to achieve a sense in their respective viewers, of being visually immersed in the moving images before them. The most common method used to achieve an immersive projection quality has been to project motion pictures, and the like, onto a large rectangular screen. Advances in film and projection technologies have since made possible the combination of high image resolution and large screen projection in improved systems such as those made popular by the international "IMAX" theatres. In the 1960's and 1970's Disneyland in Anaheim, Calif., featured an attraction having a 360° screen whereon a contiguously-imaged film projection-in-the-round was achieved. This contiguous cylindrical presentation was recorded by a ring of cameras each synchronized to one another and having a field-of-view which, was aligned next to images captured by adjacent cameras in the camera-ring. A similar arrangement of projectors-in-a-ring was utilized to synchronously project the film previously shot by the cameras.

Other innovations and advancements in projection technology for commercial and entertainment purposes, include the screens themselves, such as the refinement in materials comprising rear-projection and front-projection screens which achieve a more efficient luminance of projected images. Somewhat more fanciful seeming, yet nonetheless commercially viable, are the displays (albeit mostly static ones) which can be seen emanating from various lighter-than-air craft including large spherical helium balloons and airships each having a luminous lighting source contained therein to accentuate the messages imprinted on their semi-transparent skins. More recently, a substantial improvement in the quality of video and computer-data projection has been achieved by technology such as Texas Instruments Digital-Light-Processor ('DLP') 'chip' and newer multiple-chip DLP projection. A joint-venture by Hughes and JVC (General Motors and Matsushita parent companies, respectively) has produced the Image Lamp Amplifier or ILA® Projector.

Prior to the release of these projector technologies, most video and computer-data projected images were deficient for outdoor and large audience venues. They had lumen ratings well under 1000 lumens, which required near or total darkness to be effective, and were rendered almost useless when even small amounts of ambient light entered the projection environment. Moreover, projected video image quality, whether live or pre-recorded, had a notoriously poor reputation, lacking in resolution, contrast, color saturation and brightness, especially when there was a presence of ambient light in the environment in which they were seen.

The new video and computer-data projection technologies mentioned above, have largely overcome these limitations achieving projections which deliver 6000 lumens or better, and contrast ratios in the range of 1000:1, and in addition, have made great strides in removing the pixel-grid appearance of traditional video-display, thus, further improving image-resolution and projection quality in both low and high ambient light environments. Emerging digital broadcast and High Definition Television ('HDTV') standards and emerging HDTV projection systems further advance the quality and technological foundation upon which the present invention may now practicably be built.

Such means, as well as advancements in video (or film) image processors, and computer-generated multimedia content, also facilitate the practicability of new image delivery and display systems for exhibiting panoramic imagery, and multimedia content featuring a circularity of action, including systems that are effective in a variety of large-audience indoor and outdoor environments.

Prior to such advancements however, achieving effective, quality projection and display of visual-content required a controlled environment wherein near or total darkness must be achieved and maintained. This was especially true for live or pre-recorded video content projections. Furthermore, participant-viewers were restricted to the confines of such highly controlled environments. For example, the Disney 360° projection and display system required both near or almost total darkness, and its entire audience had to stand and rotate in an almost fixed location within the perimeter of its cylindrical screen in order to see a majority representation of the circular panorama. Thus, the viewing audience was necessarily contained well within, and some distance back from, the inner perimeter of the screen. The Disney system was also subject to the limits of film production, and consequently had no provision for live, or real-time, panoramic representations. The audience's proximity to the visual movement of projected images on the screen was also a problem, which necessitated imposing production restraints to minimize motion sickness. Any attempts to provide a circularity of action—such as racecars continually racing around an oval track—was also curtailed because it caused dizziness, and viewers had to continually rotate in place to keep up with the action.

Similar to the Disney system, other screen-in-the-round schemes have been utilized with a variety of projection approaches, including single-image panoramic projection through a fish-eye type lens onto a hemi-spherical or dome-shaped surface resulting in lower resolution image projection and similar types of viewing-environment limitations.

Such interior-of-screen viewing requirements not only substantially limit the number of viewers for each 'show' or presentation, they further limit the opportunities for other engaging and viable commercial applications. For example, arenas, stadiums, and other venues that can accommodate large audiences, do not seat or otherwise position their respective audience facing outward or away from a central point of focus within the venue, i.e. they don't offer a convenient way to rotate a viewer in a seated position so as to take in a circular panoramic view which surrounds them. Rather, the area of focus of most arena and stadium venues can easily be seen by the layout of their respective seating arrangements, which are most often inward-facing and fixed in that position. Thus, the inward-facing /surrounding circular screen approach which, requires a limited-sized audience to be confined therein and to face outward, whether in an indoor or outdoor setting, restricts screen-views to the width of one's peripheral vision at any given time and such limited-audience sites have not proven to be economically viable.

Visual-image media production and image-manipulation techniques have also advanced, due to new computer-based digital (or "non-linear") film and video production, and post-production, capabilities. These advances now include the processing power to render, in real-time (live), that which was formerly accomplished only in post-production, including the shaping, masking, cropping and edge-matching (or 'stitching') of panoramic segments and the compositing of those segments into adjacent montaged images, or synchronous images forming a contiguous panoramic imagery. Such live (or pre-recorded) image-content may be further enhanced with image insets, composites, layers, chroma keying, titling, and the like. Other transitions and effects are also possible on panorama segments and over the whole panorama, such as: pans; dissolves; wipes; fades; and, cuts; and various other 2D or 3D effects including 'keystoning'; skews; peels; and the "rendering" of images and textures onto 3D surfaces.

Nonetheless, the product of these production capabilities is typically limited to their display on some sort of rectangular screen or rectangular screen-matrix, or on cylindrically shaped screens that contain a limited-size audience therein.

With an increase in the variety of communicable video signals and increases in their respective bandwidths in various broadcast mediums including: 'cable'; telecommunications; satellites; microwave and, other data-transmission systems and networks (e.g. the Internet, intranets, Large Area Networks ('LANs'), Wide area Networks ('WANs') and the like), live panoramic displays, streaming audio and video and the means for participant-viewers to interact dynamically through these systems, both audibly and visually, are now practicable, between a plurality of locations wherein such networked interactivity can be implemented. Furthermore, de-regulations in the field of broadcast communications, and new standards for improved broadcast image resolution, allow for such new and exciting types of interactive entertainment delivery systems. For example, multi-channel, or multiplexed, simulcasts of a plurality of panoramic segments is now practicable to produce live, circumnavigably viewable panoramic broadcasts of major sporting events. Such live transmissions are viably exploited by the present invention wherein a contiguous circularity of action can be imaged onto its panoramic imaging components to render live or pre-recorded playback of Olympic track and field events, the Kentucky Derby, various oval track races such as NASCAR Races, the Reno Air Races, and other events, or even scenic panoramas particularly of a sort where a contiguous 360° representation is desired.

Accordingly, there is a need for improved image, or multimedia, delivery and display systems to upgrade the visual impact of live, or pre-recorded, exhibitable panoramic content, and to provide practicable solutions that are commercially viable in engaging a greater number of viewers, or in engaging interactive participant-viewers. There is also a need for systems that are scalable and readily transportable not only for small indoor venues but for large arenas, or other outdoor system variants, such that the viewers can readily view, and/or interact with, such systems, and experience panoramic exhibitions that are substantially contiguous and circumnavigably viewable. Furthermore, there is a need for panoramic image exhibition system-particularly of live events—that offer engaging dual-perspectives from numerous positions that are exterior to the outer perimeter of such systems whether viewed in close proximity, or viewed from a distance.

Thus, there are a number of deficiencies pertaining to the prior art, and a new system, having improved projected-image quality, improved audience viewing, improved economic viability due to a substantial increase in audience size and/or participation is needed, and such improvements are achieved with the present invention.

PRIOR ART

Review of patent documentation has not revealed a large-audience, positionable imaging and display system of the type disclosed in the present invention. As mentioned above, many panoramic imaging systems are configured for a viewing audience that must be situated well within an interior perimeter of such screens. Such an approach significant limits audience size making it more difficult to produce economically viable venues. Screen systems that do provide an external viewing of a screen's outer perimeter surface limit the viewing perspectives to less than 180 degree (for example, a perspective of a side view of such a screen). Moreover the prior art literature has not disclosed systems for displaying live contiguously panoramic content thereon, particularly of a type that would be acknowledged by one who is familiar with the art, as being of a good resolution, or of high quality. The prior art did not show a dual-perspective screen system for the imaging and displaying of visual-media content, comprising a screen configured for the display of panoramic imagery, and for displaying a circularity of contiguous action, offering dual-perspective views of an interior surface-perimeter and an exterior surface-perimeter on which, substantially contiguous panoramic visual-media content and segmented visual-media content can be imaged.

DESCRIPTION OF THE PREFERRED EMBODIMENTS

The present invention comprises a large-audience, positionable imaging and display system for the imaging and exhibition of visual-media content, especially of a panoramic type, over a wide-angle field extending up to a full 360° of azimuth. The system provides panoramic presentations on a screen-display which is formed, shaped, supported, or otherwise configured, to have a display-surface viewing area that appears substantially contiguous. The system also provides the means to exhibit visual-media content featuring a circularity of action on at least one imaging surface-perimeter of the system, and to optionally do so with synchronous and/or panning audio. The system provides support means for supporting the shape of any of a variety of screen-displays, and positioning means for positioning each screen-display to at least one height to provide views of an exterior surface-perimeter, and/or interior surface-perimeter, and to provide circumnavigable viewing of the display, or a multitude of vantage points exterior to an outermost perimeter of said display, from which to view at least one of the surface-perimeters.

Figure 1:
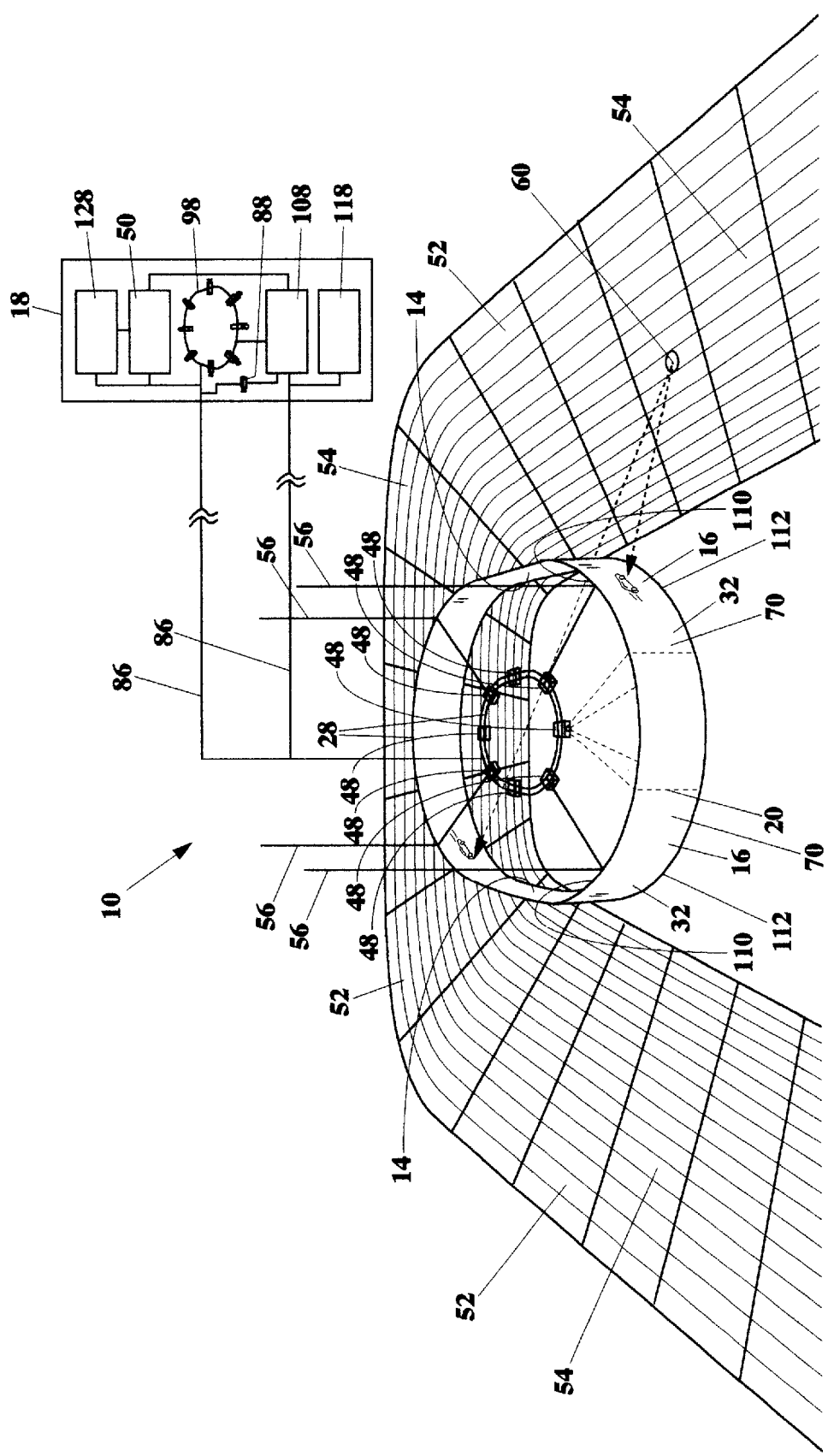
FIG. 1 is three-dimensional representation of the large-audience, positionable imaging and display system of the invention shown being connectable to video content signal (diagrammatically depicted) and located within a large-audience venue, and further illustrates a dual-perspective vantage point exterior to an exterior surface-perimeter of a substantially cylindrical display screen.

The screen-height positioning means of FIG. 1 are actuated by any one or more of a variety of known and available motion-control actuators, including but not limited to one or more: hydraulic actuators; motors or winches, or computer-automated stepper motors in combination with: cables, belts and pulley(s), rack-and-pinion arrangements, connecting arms, cams, hydraulic arms; and the like. Height positioning means are also described employing one or more lighter-than-air, or compressed, gases.

FIG. 1 illustrates a large-audience, positionable imaging and display system 10 for the imaging and exhibition of visual-media content, comprising a screen-display 32 configured for the exhibition of panoramic imagery. Display 32 is substantially cylindrical having an interior surface-perimeter 14 and an exterior surface-perimeter 16 (display 32 can alternatively be made in an rectangular, oval or elliptical shape). Each of the surface-perimeters is shaped to be substantially contiguous in appearance and sized to have a display-surface viewing area, of a panoramic type, over a wide-angle field extending up to a full 360° of azimuth, on which, substantially contiguous panoramic visual-media content and segmented visual-media content can be imaged.

FIG. 1 is a three-dimensional view representing a large-audience, positionable image delivery and display system shown generally at 10 and seen within a portion of a large-audience venue 52, such as an oval-shaped arena or stadium. Venue 52 is depicted having a customary inward-facing seating arrangement 54 a portion of which is shown partially surrounding a substantially cylindrical screen-display 32. Screen-display 32 is positionable in one or more axial, by positioning means 56 and is shown to be adjusted generally above seating arrangement 54 such that numerous exterior and interior perspectives of a substantially cylindrical screen-display 32 are offered. One of such perspectives is seen from vantage point 60. The positioning means are actuated by any one or more of a variety of known and/or available motion-control actuators, including but not limited to one or more: hydraulic actuators; motors or winches, or computer-automated stepper motors (or other motor type) in combination with: cables, belts and pulley(s), rack-and-pinion arrangements, connecting arms, cams, hydraulic arms; and the like. Thus, various, commonly known and available methods for raising and lowering objects of a size and weight similar to exhibition means 28 are employable. For example, cables can be attached to display upper support means 110 (such as in FIG. 1) and a cable-tethered display can then be raised or lowered by one or more motors, including motors that are computer-controllable, or otherwise offer automated operation (such as winch operated cables).

In the embodiment of the present invention shown in FIG. 1, exhibition means 28 is configured with screen-display 32 for the display of panoramic imagery by panoramic imaging apparatus such as a plurality of projectors 48. The panoramic imaging apparatus, so configured, projects visual-media content onto an interior surface-perimeter 14 of screen-display 32 which is preferably substantially contiguous and seamless in appearance. An example of a projected image field from a single projector is depicted in dashed lines at segment 20. Exterior surface-perimeter 16 is also substantially contiguous and seamless in appearance. Exterior surface-perimeter 16 and interior surface-perimeter 14 are sized and shaped to have a display area on which, substantially contiguous panoramic visual-media content and segmented visual-media content can be imaged. Surface-perimeters 14 and 16 can be integrally formed being comprised of the same material, such as a flexible, semi-rigid, or rigid, display-screen material. For example, the surface-perimeter(s) of screen-display 32 can be comprised of a material commonly used for rear-projection screens and can be hung or suspended in a drapery-like, or curtain-like, fashion from a display upper support means 110 by suitable coupling between support means 110 and an upper edge of the surface-perimeter(s) (coupling not shown). Support means 110 is positioned as needed by positioning means 56 and is formed of a rigid material having a screen-support perimeter that is sized and shaped to the desired dimensions of the upper portion of screen-display 32. Optionally, a display lower support means 112 can be used in addition to a display upper support means 110, and is also formed of a rigid material having a perimeter that is sized and shaped to the desired dimensions of the lower portion of screen-display 32. Lower support means 112 can be hung or suspended by suitable coupling to a lower edge of the surface-perimeter(s) of screen-display 32. Upper support means 110, lower support means 112, and the screen material comprising the surface-perimeter(s) therebetween, support the shape of screen-display 32 and are collectively responsive to positioning means 56 control to be positioned as needed. Additionally, the upper and lower support means can be sized differently, for example, upper support means 110 can be made larger than lower display support means 112 and the two means can be co-axially aligned such that a downward canting of the screen material of screen-display 32 is provided. Alternatively, display surface viewing area of screen-display 32 can be comprised of a rigid, or semi-rigid, material (e.g. suitable for rear-screen, or opaque-screen, projections) and can be coupled to a support means which in turn, is coupled to positioning means 56 for movement of the display to desired positions. The display-surface viewing area of screen-display 32 can be comprised of a plurality of screen-display segments that are supportable in an alignment adjacent to one another by one or more display support means. Alternatively, display-surface viewing area screen-display can be configured of a substantially contiguous material. In each case, the display-surface viewing area has a substantially seamless appearance and is, exteriorly and/or interiorly, viewable, or circumnavigably viewable.

Alternatively screen-display 32 can be positioned coaxially within a self-supporting auxiliary display support means 70 that is sized and shaped similar to the display-surface viewing area of display 32 and made of a rigid transparent material (such as a plastic e.g. polycarbonate, or safety-glass). The transparent material has a thickness that provides rigidity sufficient to be a support means for supporting the shape of the screen-display. Thus, the display-surface viewing area of screen-display 32 can be coaxially co-located, within a resilient transparent annular 'shell' wherein the display-surface can be comprised of a material commonly used for rear-projection screens and can simply be hung or suspended in a curtain-like fashion from an upper edge of auxiliary display support means 70 by a common coupling means (coupling not shown). Alternatively, display support means 70 can be made with a textured surface, or Furnel optical topography, or surface with an embedded material, that is optimal for projecting image-content thereon.

Whether the screen-display 32, or transparent 'shell', are comprised of rigid, or semi-rigid segments, or whether display 32 is comprised of a substantially contiguous flexible material, the large-audience, positionable image delivery and display systems of the present invention and their respective screen-displays components can be sized, and shaped to readily be, and quickly be, assembled, or disassembled, in segments, or contiguous material folded or rolled, to offer an ease-of-transportability (for example, systems that are designed to be transported within a single truck).

Two dashed lines with arrowheads, each representing a separate viewing perspective, are shown in FIG. 1 extending from a single vantage point 60 within seating arrangement 54 of venue 52. The shorter dashed line points to exterior surface-perimeter 16 and the longer dashed line points underneath a lowest perimeter of screen-display 32 to interior surface-perimeter 14. This 'dual-perspective' seen from vantage point 60 offers a viewer a circularity of action such that, an automobile race (a race is shown between two cars, each adjacent to a different dashed-line arrowhead) is seen from vantage point 60 as a substantially contiguous and panoramic representation of the race. For example, a car that is seen to travel from left to right on the nearer exterior surface-perimeter 16, will be seen travelling right to left on the further interior surface-perimeter 14.

Screen-display 32 can alternatively be located in a lower position, such as the floor level of an arena, where the view of interior surface-perimeter 14 from vantage point 60 is instead seen over a highest perimeter of the screen-display (e.g. over upper support means 110).

The circularity of action viewable from numerous dual-perspective vantage points makes it practicable to provide 'Hi-Tech Sports Arena' systems whereby live video transmissions, or pre-recorded playback, of oval-track events are viewable by entire audiences (audience members each having a dual-perspective vantage point). Such events include, but are not limited to: Olympic events such as track and field, ice rink speed-racing, and velodrome events; or horse races such as the Kentucky Derby, and various other oval track races such as NASCAR Races, the Reno Air Races, and the like.

Similarly, Oval-Track Format Video Games are also made possible by the circularity of action. For example, in a co-pending patent application of the applicant of the present invention, interactive participants seated at different dual-perspective vantage points around the screen-display can each use video-game type controllers, such as hand-controller, or wireless handheld, devices (such as cell phones or Person Digital Assistant 'PDAs') to compete with one another in various types of panoramic games, races, or battles. In which case, an image processing means 50 is comprised of available video game components for example, at least one CPU, an operating system, input-controller signal-acquiring means, and at least one panoramic game software application. When so configured, image processing means 50 renders panoramic video game imagery suitable for screen-display imaging by exhibition means 28, and is responsive to the input from a hand-controllable interface of a game controller device such that hand adjustments of the device interface cause predictable outcomes to the scene elements, video sprites, and/or environments that make up a panoramic game, race, or battle seen on screen-display 32. Panoramic game software applications are written to include software algorithms, or software routines, to seamlessly edge-match an array of video segments including, game backgrounds, environments, moving objects, video sprites, and/or other scene elements, when any or all of such are moving from, transitioning from, or overlapping between, one screen-display segment to another adjacent screen-display segment of screen-display 32. Software algorithms, or software routines, can also be provided, to save and/or load games, replay games, or to network games to one or more similarly configured system, or network to signals of other image processing means 50, such as the locally or remotely generated control signals described in the text pertaining to FIG. 17.

'Oval-Track Format Video Game' races can include (or switch, 'morph', or otherwise modulate, between): various race cars (including 'virtual slotcars'), race planes, jets, turn-of-the-century biplanes, race boats, ships, submarines, horses, runners, greyhounds, roller derby skaters, chariots, stagecoaches, and so forth. Panoramic video-game battles can also be provided, where one or more armed force controlled from one side of the screen-display is rallied against one or more armed force controlled from an opposite side of the screen-display. For example, one dual-perspective panoramic software application features fleets of ships to engage the other team at any point on the screen in panoramic sea battles including aircraft carriers, planes, submarines, and the like. Other panoramic software applications feature land battles, or fantasy panoramic battles between gladiators, knights, or dinosaurs. Teams can play simpler panoramic software games designed for competition from opposite sides of the panoramic screen like the old game "Battleship" (in such a case the screen-display could be separated by an opaque divider to block the view of an opposite of the screen).

The systems' exhibition means 28 can also include an array of speakers (not shown in FIG. 1) located adjacent to, or near to, the perimeter of the dual-perspective screens to audibly enhance the visual circularity of action by synchronizing the panning of sound to the objects moving on screen. For example, when a racecar moves from a left side to a right side of the screen, the racecar's audio and panning thereof follows the movement of the car seen on screen. During a real race (e.g. NASCAR 'short-track' race) an array of microphones located around a perimeter of the actual race-track provide discreet audio signal to respectively located speakers in the speaker array of exhibition means 28. Alternatively, the audio source provided to each speaker in a system's speaker array can be derived from microphone-equipped cameras such that the visual object motion (and its corresponding sound) that is captured in proximity of any in an array of cameras, is accurately reproduced by a corresponding array of similarly disposed projectors and speakers (see also FIGS. 4–8). The array of speakers are positioned around a perimeter of the system's display 32 in a manner typically used for suspending speakers, and are driven by audio amplifiers each connected with at least one audio source to provide the sound-system of exhibition means 28, and as desired, to provide a panning of audible sound.

Thus, dual-perspective viewpoints offer simultaneous interior and exterior views of screen-display 32 while optionally providing synchronized audio and speaker panning, and a multitude of such dual-perspectives are offered in any venue equipped with the present invention.

The large-audience, positionable imaging and display system 10 provides an exhibition means 28 for imaging and controlling contiguous panoramic visual-media content and segmented visual-media content that can be imaged on at least one surface-perimeter of screen-display 32. The exhibition means include any one or more of a variety of apparatus known for imaging, processing, or controlling, visual-media and/or audio content. Screen-display 32 surrounds a plurality of imaging devices shown as a plurality (a ring) of projectors 48 in FIG. 1, wherein the projectors are outward-facing to project image-content onto an array of adjacent panoramic segment(s) 20 around an interior surface-perimeter 14 of screen-display 32 (for example, onto a rear-projection screen material). Dashed lines extending from one projector are used to approximate an example of a projected field and/or a screen segment. Alternatively, the plurality of projectors 48 can be inward-facing to surround and provide imaging onto the exterior surface-perimeter 16 of screen-display 32 (shown in FIG. 7). Additionally, both systems, or redundant projectors projecting onto a single screen-segment, can be used simultaneously to increase image brightness by combining their projector-imaging, or to project different imagery onto the inner and outer surfaces of substantially opaque screen material. In the use of either the film or video projection method, multiple projectors can be synchronized, by employing any one or more of a variety of available and known synchronization apparatus, for example, by using one or more SMPTE control devices. Image projection content, when the visual-media content exhibition means of system 10 incorporates film projection, is derived from processed film.

When exhibition means 28 incorporates video projection, image projection content is acquired locally, and/or remotely, and is generated from any one or more of a variety of known video-source supplying means and are transmitted through suitable signal transmission means 86 (e.g. wire, cable, fiber optic cable, or wireless transmissions, etc.). For example, the large-audience, positionable imaging and display system 10 in FIG. 1 is shown being locally or remotely connectable with (diagrammatically depicted) video-content signal 18 which can include video reception from any one or more of a variety of video apparatus including: video image processing means 50, single-camera signal 88, panoramic image-capturing signal 98, recordable-video signal 108 (analog or digital video), pre-recorded-video signal 118 (analog or digital video), satellite video-reception apparatus 128, and so forth. Live, segmented and panoramic video content (and audio content) reception includes receiving live transmissions from video image-acquiring means including: one or more cameras, or camera array, and pre-recorded, edited, or otherwise imageprocessed video 'signals'. Video signal-acquisition is also achieved from connection with the playback output of one or more of recorded video sources, including: NTSC; PAL; HDTV; computer storable video (and audio) data; DVD; 'DV'; 'miniDV'; MPEG signals, streaming video and audio, image-processors, and the like.

Reception of video signal from one or more of a variety of known image processing means 50 provides shaping, masking, cropping and edge-matching (or 'stitching') of panoramic segments and the compositing of those segments into adjacent montaged images or synchronous images forming a contiguous panoramic display. Live (or pre-recorded) imagery can be further enhanced with image manipulation and video effects, including: insets, composites, layers, chroma keying, titling, and the like. Other transitions and effects are also possible on panorama segments and over entire panoramas using known image processing apparatus. Such processing and effects can include: pans; dissolves; wipes; fades; and, cuts; and various other 2D or 3D effects including 'keystoning'; skews; peels; and the "rendering" of images and textures onto 3D display surfaces, or the rendering of 3D projections onto panoramic screens. Thus, image shaping and keystoning, and image-stitching or edge-matching, and a wide variety of effects are employable on any of a variety of panoramic display screens including the three-dimensionally shaped displays illustrated in the figures of the present invention—i.e. on panoramic displays that are, exteriorly, and/or interiorly viewable, or circumnavigably viewable.

Video reception apparatus provides means for the synchronous reception and display of multi-channel, or multiplexed, video content—such as a live event multi-channel satellite simulcast—wherein video-content signal 18 is comprised of a plurality of panoramic video segments. The video content signal is conveyed by suitable signal transmission means 86 to exhibition means 28 comprising a screen-display 32 and a plurality (a ring) of projectors 48 coaxially mounted therein. The plurality of projectors 48 are configured to be outward-facing to exhibit the collective segments as one substantially contiguous panorama of the live broadcast on display 32. For example, panoramic image-capturing signal 98 can be derived from a ring of video cameras at a remote location, or simply be locally located coaxially beneath screen-display 32, such that, in the latter case, a live panoramic view of the audience in seating arrangement 54 of venue 52 is exhibitable on screen-display 32 and is also transmittable for live representation on similarly-configured exhibition means in one or more other venue. Thus the means are provided for entire audiences, or portions thereof, to see and interact among themselves, or with other audiences and audience portions regardless of geographic location, or the number of geographic locations.

Projectors 48, whether projecting pre-recorded film, or video imagery, each project an algorithmically and/or optically shaped and edge-matched panoramic segment 20. The imagery is synchronously projected adjacent to other segments to produce a substantially contiguous panoramic display of entire panoramas, or of segmented imagery, and when the exhibition means incorporates video projection, can do so live, or in 'real-time'.

Lastly, is noted that while FIG. 1 has illustrated a large-audience, positionable imaging and display system that is substantially cylindrical in shape, that many of its benefits and advantages can also be achieved by employing a partial cylindrical, or arced, segment of the display. In which case, the employment of a positioning means is also possible to locate the arced-display for dual-perspective viewing such that the display-segment is, exteriorly, and/or interiorly, viewable, or circumnavigably viewable. Additionally, it is to be noted that a positioning means can be configured to raise, or lower, or tilt, or, when operative from a gantry, to move, display system 10.

Figure 2:
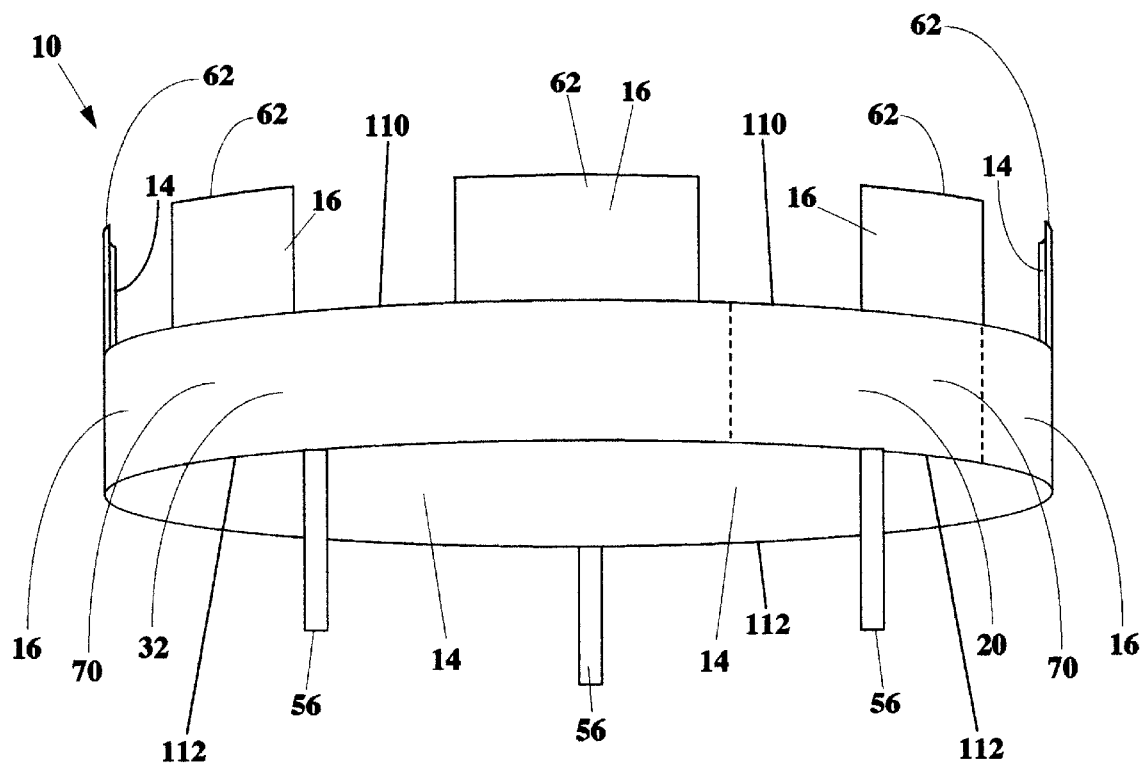
FIGS. 2 and 3 are side perspective views of display screen variants having an interior surface-perimeter and an exterior surface-perimeter that are circumnavigably, exteriorly, and/or interiorly, viewable, with FIG. 2 further comprising auxiliary rectangular screens, and FIG. 3 having a dome-shaped display.

FIG. 2 illustrates a large-audience, positionable imaging and display system 10 for the imaging and exhibition of visual-media content, comprising a screen-display 32 configured for the exhibition of panoramic imagery. Display 32 has an interior surface-perimeter 14 and an exterior surface-perimeter 16, wherein, each of the surface-perimeters is shaped to be substantially contiguous in appearance and sized to have a display-surface viewing area on which, substantially contiguous panoramic visual-media content and segmented visual-media content can be imaged and seen by a multitude of people. Display 32 is exteriorly, and/or interiorly, viewable and/or circumnavigably viewable, and exhibits projected imagery derived from visual-media content exhibition means such as the methods and means described in the previous descriptions pertaining to FIG. 1 for imaging, processing, and/or controlling, contiguous panoramic visual-media content and segmented visual-media content on at least one surface-perimeter of screen-display 32. Dashed lines are used to approximate the shape of a projected panoramic segment 20. The surface-perimeter(s) of screen display 32 can be comprised of a material commonly used for rear-projection screens and can be hung or suspended in a drapery-like, or curtain-like, fashion from a display upper support means 110 by suitable coupling between support means 110 and an upper edge of the surface-perimeter(s). Support means 110 is positioned as needed by positioning means 56, above or below the screen, and is formed of a rigid material having a screen-support perimeter that is sized and shaped to the desired dimensions of the upper portion of screen-display 32. Optionally, a display lower support means 112 can be used in addition to a display upper support means 110, and is formed of a rigid material having a perimeter that is sized and shaped to the desired dimensions of the lower portion of screen-display 32. Lower support means 112 can be hung or suspended by suitable coupling to a lower edge of the surface-perimeter(s) of screen-display 32. It is to be noted, as previously described, that the surface-perimeter of screen-display 32 can alternatively be comprised of a rigid, or semi-rigid, material (e.g. suitable for rear-screen, or opaque-screen, projections), in which case such material can be suspended from upper support means 110 solely and moved to desired positions by positioning means 56. Additionally, the upper and lower perimeters of display 32 can be sized differently, for example, uppermost perimeter can be sized larger than lowermost perimeter to provide a downward canting of the screen material of screen-display 32. Optionally, one or more auxiliary screen 62 can be used to augment the image delivery and display system as seen in FIG. 2, for example, when it is desirable to show camera close-ups, such as action shots, one or more screen 62 can be employed to display conventional camera views while panoramic content—whether panoramic or segmented—is exhibited on screen-display 32. It is noted that insets of camera close-ups are also possible within one or more portion of screen-display 32 or screen 62. Display positioning means 56, which by way of example are shown as struts supporting screen-display 32 from below, shown in FIG. 2, can be employed to raise or lower the display system to offer variable perspectives as desired (also shown in FIG. 11). Alternatively, screen-display 32 can be positioned coaxially within a self-supporting auxiliary display support means 70 that is sized and shaped similar to the display-surface viewing area of display 32 and made of a rigid transparent material (such as a plastic e.g. polycarbonate). The transparent material has a thickness that provides rigidity sufficient to be a support means for supporting the shape of the screen-display. Thus, the display-surface viewing area of screendisplay 32 can be comprised of a material commonly used for rear-projection screens and can be hung or suspended in a curtain-like fashion from an upper edge of auxiliary display support means 70 by a common coupling means (coupling not shown).

Figure 3:
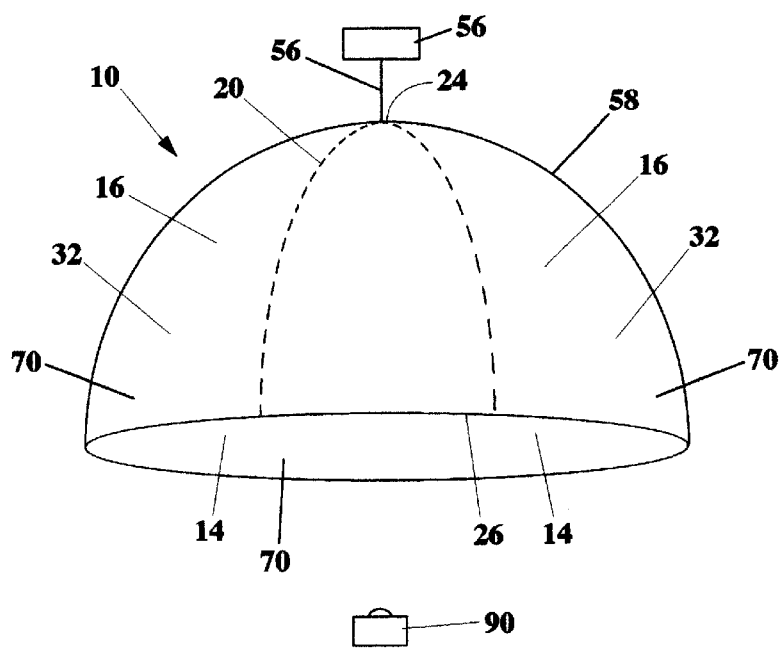

FIG. 3 illustrates a large-audience, positionable imaging and display system 10 for the imaging and exhibition of visual-media content, comprising a screen-display 32 configured for the exhibition of hemispherical panoramic imagery. Display 32 has an interior surface-perimeter 14 and an exterior surface-perimeter 16. Each of the surface-perimeters is shaped to be substantially contiguous in appearance and sized to have a display-surface viewing area, of a panoramic type, over a wide-angle field extending up to a full 360° of azimuth, on which, substantially contiguous panoramic visual-media content and segmented visual-media content can be imaged. The domeshaped surface of screen-display 32 is circumnavigably viewable and is shown having an exterior surface-perimeter 16 and an interior surface-perimeter 14, with dashed lines approximating a single projected panoramic segment. The segment extends from the dome zenith 24 to the outermost dome perimeter 26 (also shown in FIG. 9). When screen-display 32 is configured with a material used for rear-projection screens, projected imagery is viewable on an interior and/or exterior surface-perimeter of the dome. For example, a hemispherical projection of star constellations rendered onto an interior surface-perimeter 14 would also appear on exterior surface-perimeter 16. Similarly, a video game rendered onto an interior surface-perimeter 14 would also appear on exterior surface-perimeter 16 (and vice versa). Alternatively, a fisheye projection means 90 can be used to project panoramic visual content images upward and into the dome-shaped surface of screen-display 32. Optionally, a lower support means 112 can be hung or suspended by suitable coupling to a lower edge of the surface-perimeter(s) of screen-display 32 to facilitate the shaping of the display. Alternatively, one or more hemispherical arc support 58 formed of a rigid, or semi-rigid material, can be employed to assist in the shaping and/or positioning of the display (e.g. when coupled to positioning means 56). It is noted that the surface-perimeter of screen-display 32 can alternatively be comprised of a rigid, or semi-rigid, material that is self-supporting and suitable for either rear-screen, or opaque-screen, projections. Alternatively screen-display 32 can be positioned over (or within) a self-supporting auxiliary display support means 70 that is sized and shaped similar to the display-surface viewing area of display 32 and made of a rigid transparent material (such as a plastic e.g. polycarbonate, or safety-glass). The transparent material has a thickness that provides rigidity sufficient to be a support means for supporting the shape of the screen-display. Thus, the display-surface viewing area of screen-display 32 can be comprised of a material commonly used for rear-projection screens and draped over the top of auxiliary display support means 70 by a common coupling means (coupling not shown).

Figure 4:
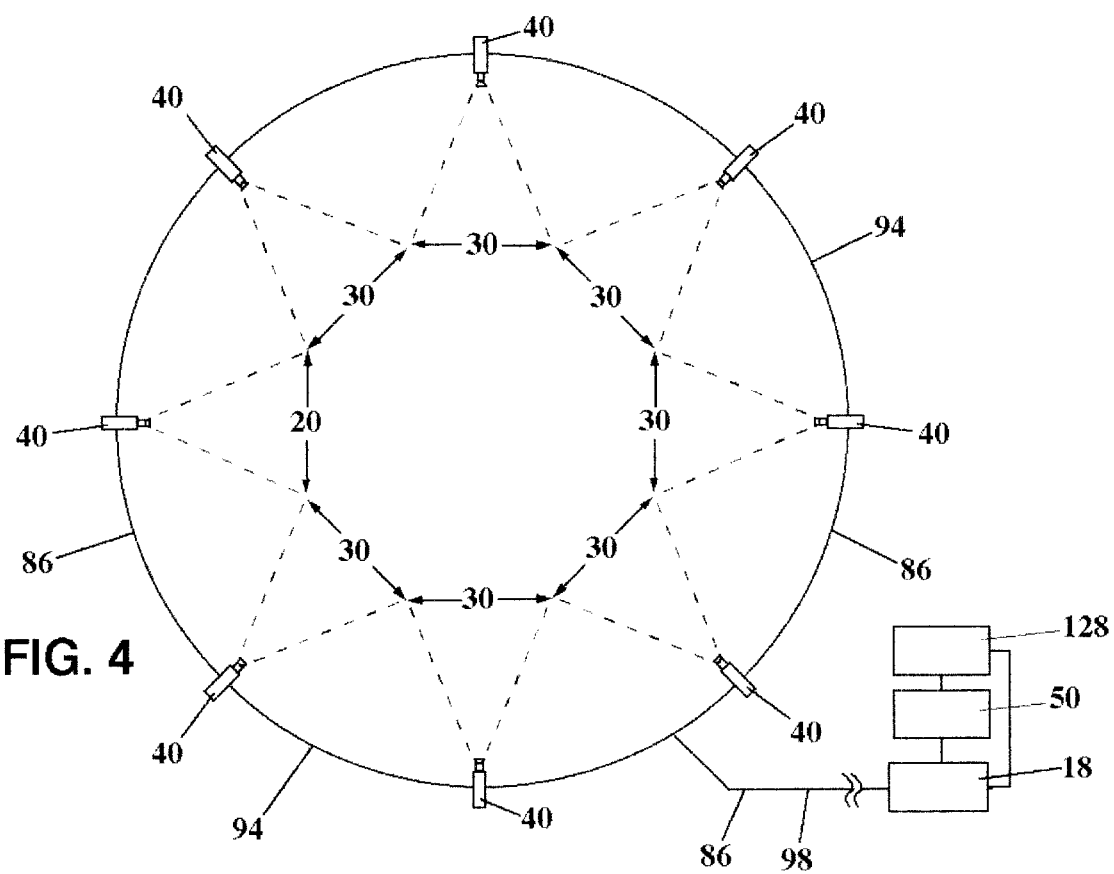
FIGS. 4 and 5 show two diagrammatical views, as seen from above, illustrating panoramic image capturing means comprising a ring of inward-facing cameras in FIG. 4 and a ring of outward-facing cameras in FIG. 5 each of which is connected with, or wirelessly communicates with, a video image processing means.
Figure 5:
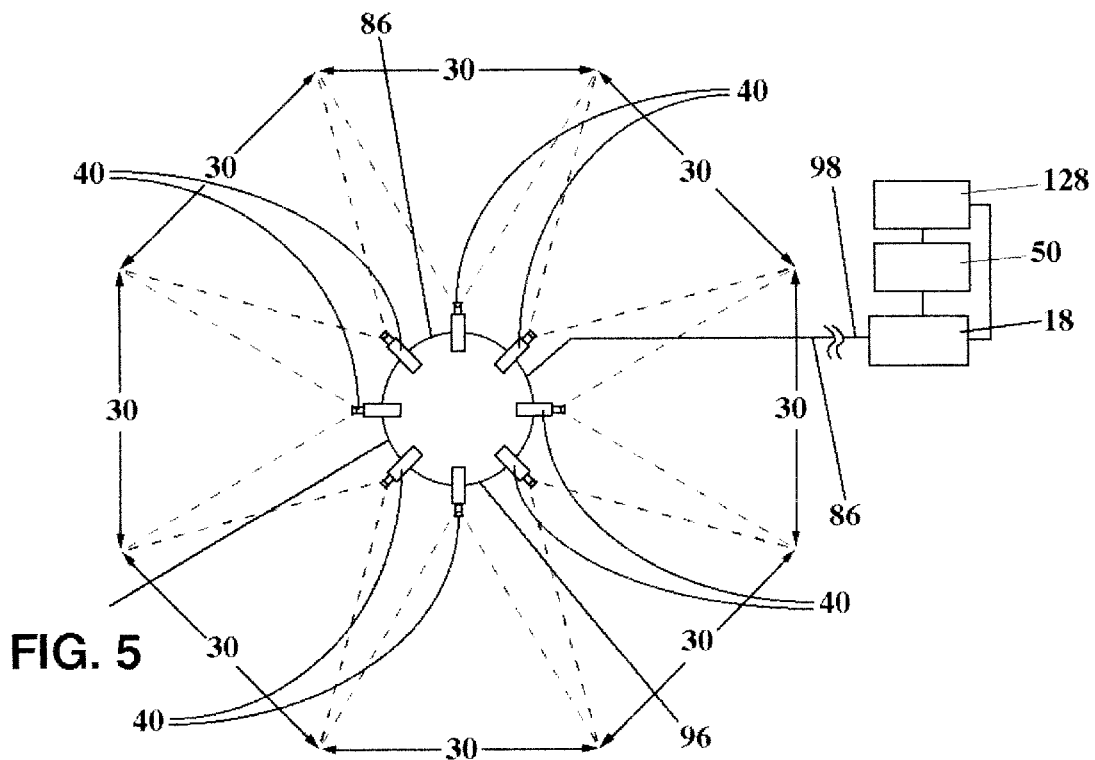
Figure 6:
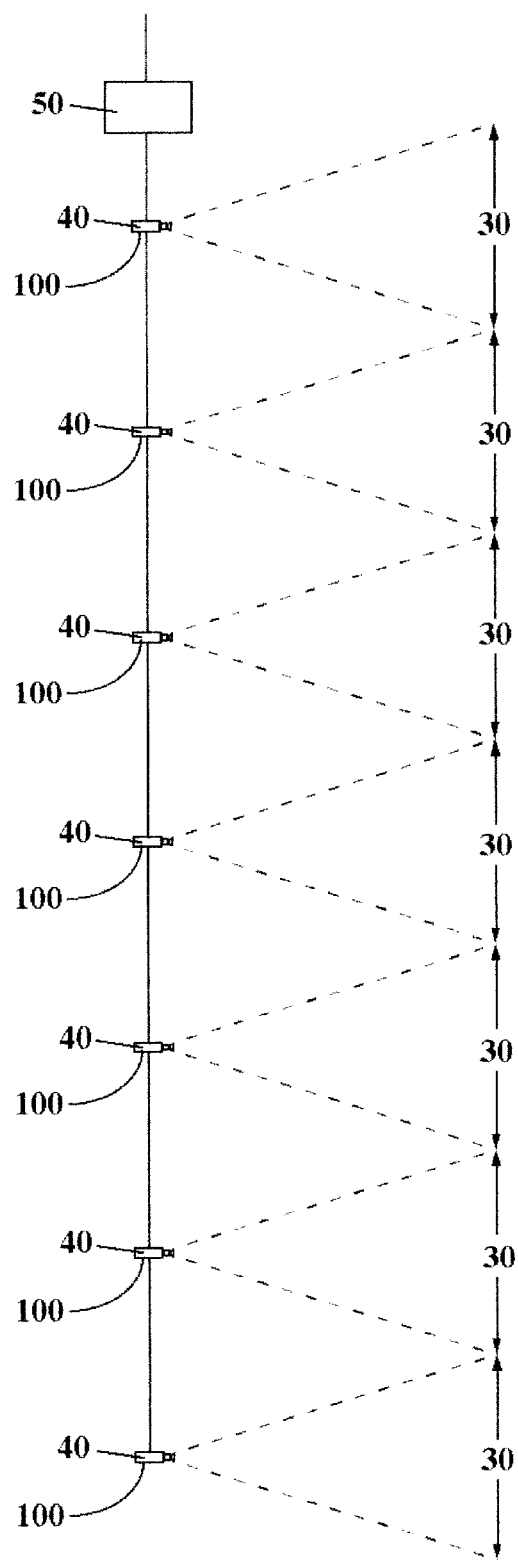
FIG. 6 shows a panoramic image capturing means comprising an array of cameras which is connected with a video image processing means.

FIGS. 4 through 6 diagrammatically illustrate panoramic image-capturing apparatus (as seen from above) comprising a plurality of cameras 40 that are configured as a camera ring 94 of inward-facing cameras 40 in FIG. 4, and a camera-ring 96 of outward facing cameras 40 in FIG. 5, and laterally-aligned camera array 100 in FIG. 6. A plurality of video segments 30 is conveyed as panoramic image-capture signal 98 by each camera array via suitable signal transmission means 86 to provide video-content signal 18. Signal 18 is conveyable to any one or more of a variety of known video-signal apparatus, for example (diagrammatically depicted): video image processing means 50, satellite video-reception apparatus 128, and so forth. Video camera signal is transmittable to a respective ring or array of projectors 48 (e.g. as depicted in FIG. 1, and FIGS. 7 through 9) to exhibit the collective segments as one substantially contiguous panorama of live, or recorded, video on a screen-display 32.

The camera product when image-capturing apparatus is comprised of video cameras is video-content signal (for example, such formats as NTSC, PAL, S-VHS, S-Video, HDTV, DVD, 'DV', computer storable multimedia data, and the like), and in the case of film cameras the product is film. In FIGS. 4 through 6 dashed lines are used to approximate camera fields of view. The cameras so configured, can each capture a panoramic segment image 30, and when comprised of video cameras, can do so 'live' or in 'real-time'. In live applications, each of the cameras respective video-content signal is communicable with any one or more of a variety of known video image transmitters, manipulation and control, or image processing means 50 such as image recording, image playback, image processing, and transmission and/or broadcasting devices. Such signal processing can also include multi-channel, or multiplexed, broadcast and reception apparatus for communicating a plurality of video-content signals of the panoramas or multiple panorama segments, between one locale and at least one other locale. In which case, the plurality of signals, as panoramas, or panoramic segments, are synchronously, adjacently and collectively displayed on a screen-display 32. The size and shape of each panoramic image segment 30 is calculated from the respective size and shape of the screen-display 32 on which it will be displayed, and is subject to algorithmic processing, or digital-domain image conditioning, to optimally conform it to that shape. Video image processing means 50 can also provide segment image conditioning, to control and arrange panoramic segment image pixels to achieve, as needed, segment: scaling; shaping; masking; 'keystoning'; edge-matching (or stitching); insets; cropping; and, aspect ratio scaling; including, such processing during camera zooms and pans. Thus, numerous types of 3-dimensionally shaped screens and the respective panoramic image segments thereof, can be configured for use with large-audience, positionable imaging and display systems of the present invention. Panoramic and video image segment processing are also possible thorough an effects buss, digital video effects (DVE), or video switcher including arrays thereof (e.g. one of such device[s] per camera signal). Such effect arrays can electronically-render pans of one or more segment (e.g. 360 degree, or 720 degree, pans), among other commonly known video processing and effects techniques.

The reception of signal received from one or more processing means 50 is synchronized for playback and collective representation of contiguous panoramic images, using any one or more of a variety of known or commercially available synchronizing apparatus, and for montaged imagery on one or more screen segment. Additionally, it can be seen that the image-capturing means can be used to capture panoramic segments for the purpose of processing and rendering such segment images 3-dimensionally. For example, the capture of two or more adjacent image segments 30 by camera-ring 94 (FIG. 4) can provide stereoscopic data to an image-processing means 50 that is capable of processing such data for playback into, or onto, any of a variety of displays suitable for 3D viewing, or for viewing using stereoscopic glasses.

FIG. 6 diagrammatically depicts image-capturing apparatus in an aligned camera array 100 having a plurality of cameras 40 configured in alignment to one another. Being so configured, each camera 40 is able to segmentally represent a portion of a contiguous panoramic view which can be exhibited on a screen-display 32 as an entire panorama, or pannable panoramic segment, or can be exhibited on one or more accent screen 62. For example, an array of such cameras could be positioned along the length of a football or soccer field, or along the length of a drag race. The size and shape of each captured image segment 30 can be algorithmically processed, or otherwise image-processed, when the video-content signal is communicated through video image-processing means 50 such as one or more of the means described above. Dashed lines are used to approximate the horizontal field of view of each camera 40 and represent a plurality of panoramic image segment 30.

Figure 7:
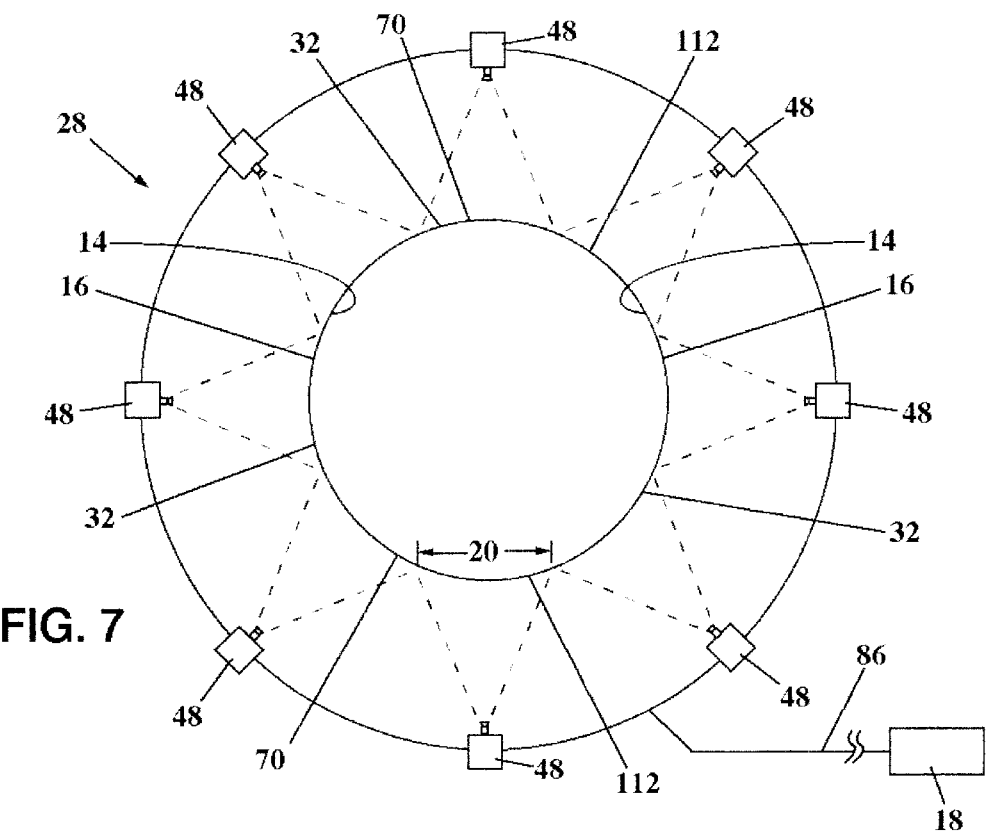
FIGS. 7 and 8 show two diagrammatical views, as seen from above, illustrating visual-media content exhibition means comprising a ring of inward-facing projectors in FIG. 7 and a ring of outward-facing projectors in FIG. 8 each of which are equipped to acquire signal from a video-content source. Each projector is shown projecting a panoramic segment, represented in dashed lines, on a panoramic display.
Figure 8:
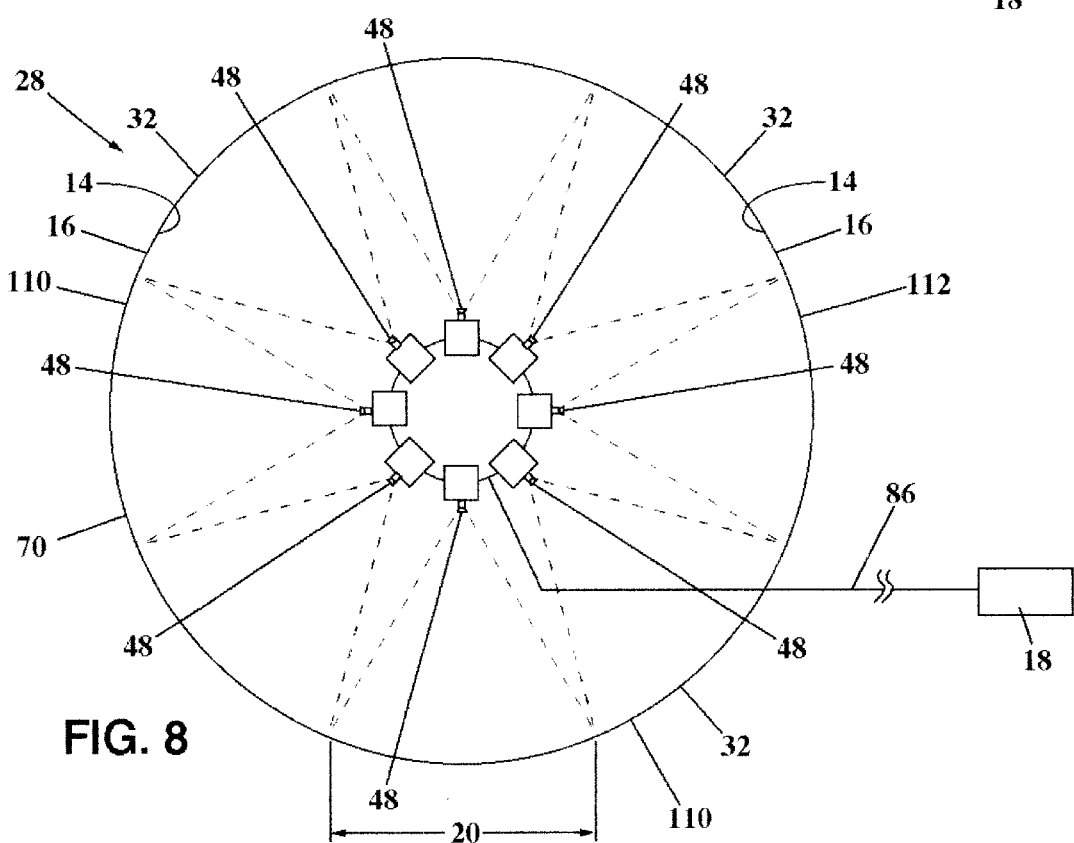

FIGS. 7 and 8 diagrammatically illustrate exhibition means 28 shown from above comprising a plurality (a ring) of projectors 48 which are configured to be inward-facing in FIG. 7, and outward-facing in FIG. 8. Dashed lines are used to approximate each projected field in both FIGS. 7 and 8 (having a horizontal field of projection equal to a panoramic segment 20). Image projection content, when means 28 is comprised of video projectors, is derived from any of a variety of video-content signal 18 and is transmitted via suitable signal transmission means 86. Such signal can include live, edited, or otherwise image-processed, NTSC; PAL; HDTV; S-VHS; S-Video; DV; mini-DV; computer storable multimedia data, streaming video and audio signals, and the like. Image projection content, when means 28 is comprised of film projectors, is derived from processed film. It is noted that the projectors when so configured—whether projecting film or video images—can each exhibit a projected field and panoramic segment 20 which can be synchronized with and positioned adjacent to other projected segments, and when comprised of video projectors, can do so live, or in 'real-time'. For example, live reception of video captured segments include the synchronous reception and display of multi-channel, or multiplexed, broadcasts, or simulcasts. When video-content signal 18 is comprised of a plurality of panoramic video segments, such segments are transmitted by suitable transmission means 86 to projectors 48, to exhibit the collective segments as a substantially contiguous panoramic image, and optionally as panoramic montages of diverse images. Signal 18 of exhibition means 28 is locally or remotely acquired with any one or more of a variety of video apparatus including: video image processing means 50, single-camera signal 88, panoramic image-capturing signal 98, recordable-video signal 108 (analog or digital video), pre-recorded-video signal 118 (analog or digital video), satellite video-reception apparatus 128, and so forth (as described in the text pertaining to FIG. 1). Alternative transmission means are also provided including: wire, fiber optic cable, IEEE-1394 cable or 'Firewire', wireless transmission, satellite transmissions, and the like. Both film and video projectors 48 are synchronized (e.g. by SMPTE synchronization) and project panoramic segments that have been algorithmically and/or optically shaped and edge-matched (or edge-stitched) for adjacent segment projection and alignment. The panoramic segments are shaped and edge-matched according to the size and shape of the respective panoramic display screen on which they are displayed. Projected images of projectors 48 are exhibitable on viewable surface 16 and/or 14 of screen-display 32 which, by way of example, is shown to be approximately cylindrical (as seen from above) and the projected images are viewable on both surfaces simultaneously when display screen-display 32 is comprised of a semi-transparent material, such as the type of material used for rear-screen projection screens.

Alternatively, it is to be noted that screen-display 32 can have both an inner-ring and an outer-ring of projectors exhibiting imagery on the interior and exterior surfaces respectively, for example when an opaque screen material is used, or when a rear-projection image is meant to be made brighter with two opposite but registered projections per screen segment and/or when a superimposition of images is meant to be exhibited thereon. Or, redundant projectors can be aligned to project the same image-content on a given screen-segment to increase the brightness of the projected imagery, and/or to provide a backup second projector in the event of a failure of a first projector. In each case, screen-display 32 provides a substantially contiguous circumferential surface that is circumnavigably viewable in close proximity or from a distance, and is exteriorly, and/or interiorly, viewable.

Figure 9:
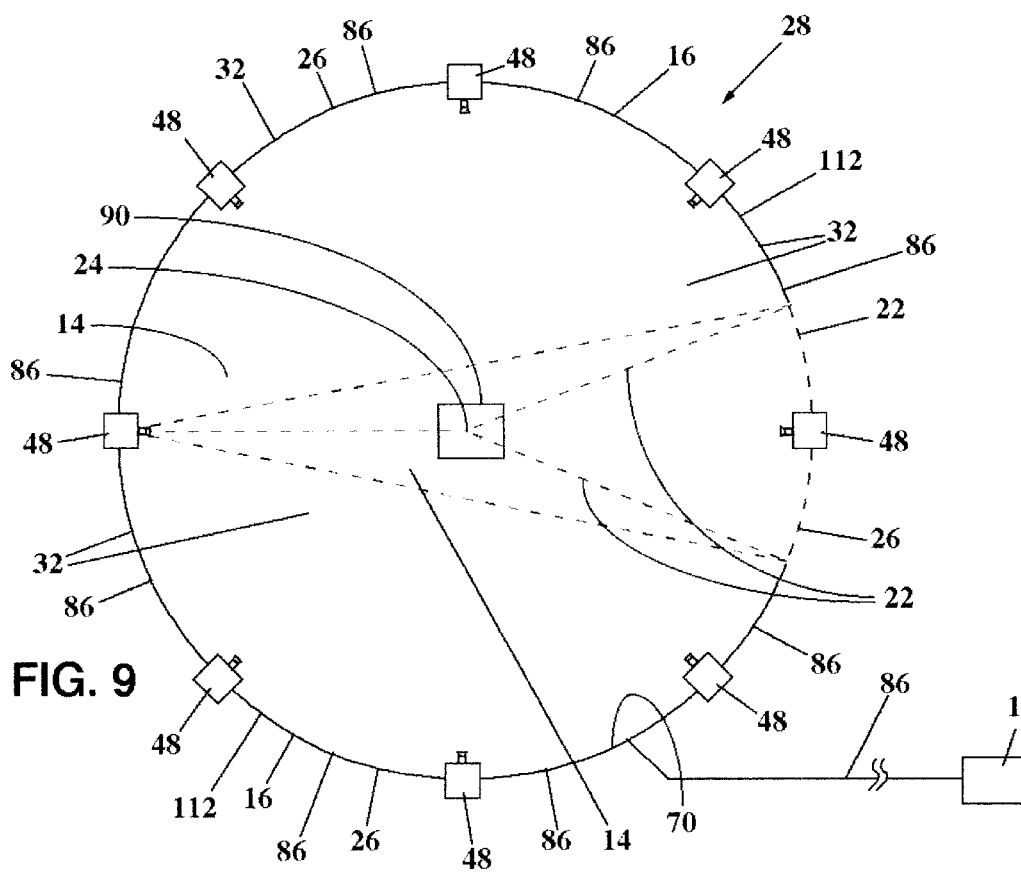
FIG. 9 is a diagrammatical bottom view, of a large-audience, positionable imaging and display system illustrating visual-media content exhibition means suitable for projecting panoramic segments in one embodiment onto a domed surface, and for projecting a 'fish-eye' projection onto a domed surface in another embodiment.

FIG. 9 diagrammatically depicts the exhibition means 28 of the type of panoramic screen-display 32 first seen in FIG. 3. Display 32 is substantially contiguous and circumferential about a hemispherical three-dimensional shape (a dome shape as seen two-dimensionally from below). The dome-shaped screen-display 32 is positionable to at least one height by a positioning means 56 (as described in the text pertaining to FIG. 3) for interior and/or exterior viewing, and for circumnavigable viewing by a multitude of people. Screen-display 32 has an exterior surfaceperimeter 16 and an interior surface-perimeter14, with dashed lines approximating a single projected panoramic field and hemispherical segment 22 on screen-display 32 extending from the dome zenith 24 to the outermost dome perimeter 26. Shown adjacent to perimeter 26 (and optional lower support means 112), are visual-imaging apparatus of exhibition means 28 comprised of a plurality of projectors 48, each configured to exhibit and segmentally represent a portion of a panoramic view. Each of projectors 48 receive video-content signal 18 via any one or more of a variety of known, or available, video signal transmission means 86. When video content signal 18 is transmitted to exhibition means 28, the projectors 48 exhibit sized and shaped panoramic displays which appear as contiguous panoramic imagery on one or more viewable surface-perimeters. The imagery is viewable on both surfaces simultaneously when screen-display 32 is comprised of a semi-transparent material, such as the type of material used for rear-screen projection screens. It can be seen that similar panoramic projections can be achieved on a variety of three dimensional shapes and panoramic portions thereof, such as spheres and portions of spheres; blocks and portions of blocks; cylinders and portions of cylinders; cones and portions of cones; and so forth. Optionally, a fish-eye type projection means is shown at 90 to project panoramic visual content images upward and into the dome-shaped surface of screen-display 32. It is also noted that a ring of projectors approximately one half the diameter of the dome, can instead be coaxially positioned below the dome projecting imagery upward. Conversely, a ring of projectors approximately twice the diameter of the dome, can instead be placed coaxially above the dome projecting imagery downward. In either case, when screen-display 32 is comprised of a rearprojection screen material the projectors will render panoramic views thereon that are exteriorly and/or interiorly viewable in close proximity or viewable from a distance.

Figure 10:
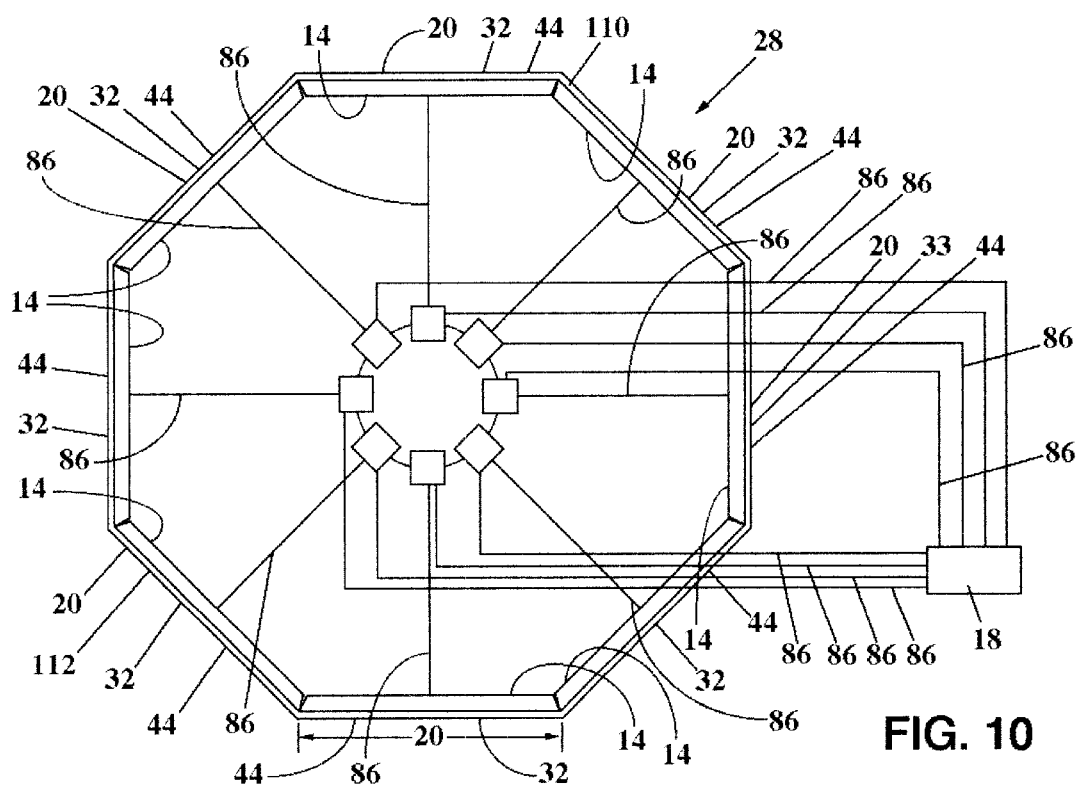
FIG. 10 illustrates a large-audience, positionable imaging and display system comprising electronically imaged display screens each comprising pixel elements.

FIG. 10 illustrates a large-audience, positionable imaging and display system 10 for the imaging and exhibition of visual-media content, comprising a screen-display 32 configured for the exhibition of panoramic imagery. Display 32 has an interior surface-perimeter 14 and an exterior surface-perimeter 16, wherein, each of the surface-perimeters is shaped to be substantially contiguous in appearance and sized to have a display-surface viewing area on which, substantially contiguous panoramic visual-media content and segmented visual-media content can be imaged. FIG. 10 diagrammatically illustrates an exhibition means 28 having a screen-display 32 (as seen from above) comprising a plurality of electronically-imaged display screens 44 each having a pixel element display for the exhibition of a projected panoramic segment 20. Each of display screens 44 receive video-content signal 18 via any one or more of a variety of known, or available, video signal transmission means 86. The video-content signal can be any one or more of a variety of known video signals including: live, edited or otherwise processed NTSC; PAL; S-VHS; S-Video; DV; mini-DV; DVD; HDTV; computer storable multimedia signal, streamable video content, video game signal, and the like. Screen-display 32 is collectively made up of a panoramic array comprising any one or more of a variety of known pixel element displays e.g. Cathode Ray Tubes (CRT); Liquid Crystal Displays (LCD); Gas Plasma display screen technology; Flat Panel screen technology; HDTV technology, or technology of the like. It is also to be noted that flexible pixel element displays, or other flexible pixelated material, are currently under development by hi-tech firms such as Xerox Corporation and IBM which, when available, can readily be integrated into the one or more screen-display 32 of the present invention. With the pixel element displays as configured in FIG. 10, each display screen 44 exhibits a panoramic segment 20 which can be synchronized to adjacent projected segments, and can do so 'live' or in 'real-time'. Such imagery exhibited on screen-display 32 appears substantially contiguous, panoramic and circumnavigably viewable. Inward-facing surfaces 14 can also be comprised of electronically-imaged display screens 44 to optionally provide substantially panoramic image display on the interior surface-perimeter 14 of screen-display 32 such that panoramas rendered thereon are exteriorly and/or interiorly viewable. Cumulative pixel element displays, or flexible pixelated material, when integrated into a screen-display 32, can be coupled to and supported, as previously described, by a display upper support means 110, and can also be coupled to and supported by display lower support means 112. In either case, the support means are sized and shaped to the desired dimensions of the screen-display 32 and can be coupled by any one or more of a variety of known coupling methods to a positioning means 56 (not shown). Thus, the screen-display 32 shown in FIG. 10, is positionable to at least one height by positioning means 56, for exterior, and/or interior viewing, and circumnavigable viewing.

Figure 11:
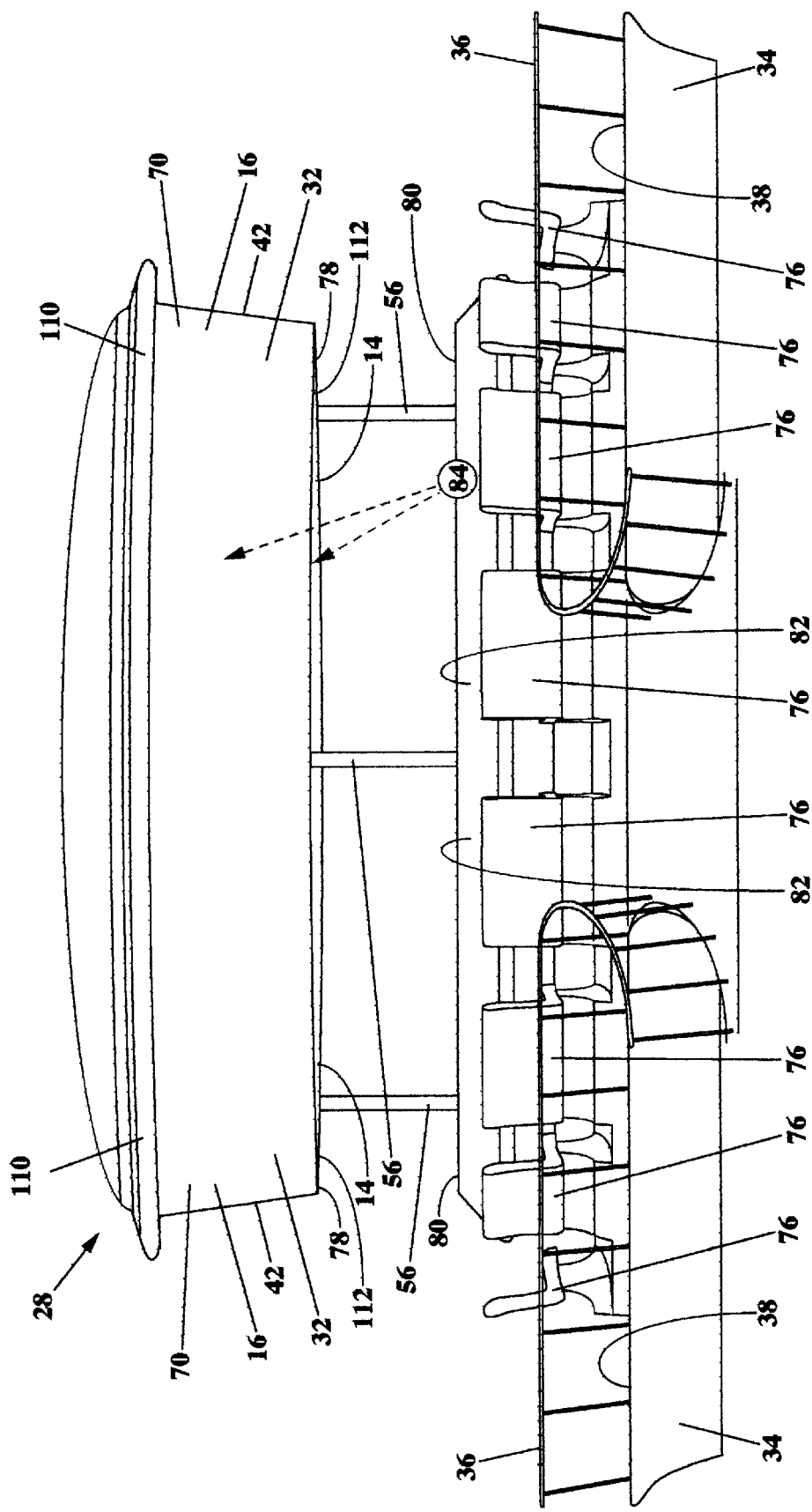
FIG. 11 shows a front view of a large-audience, positionable imaging and display system suitable for a retail, educational or research facility, or command-and-control center, and further illustrates screen positioning means suitable for adjusting the height and the dual-perspective angle of the screen relative to a multiplicity of surrounding viewers.

FIG. 11 illustrates a front view of a large-audience, positionable imaging and display system 10 for the imaging and exhibition of visual-media content, comprising a screen-display 32 configured for the exhibition of panoramic imagery. Display 32 is substantially cylindrical, as previously described, having an interior surface-perimeter 14 and an exterior surface-perimeter 16 (with minor changes display 32 can also be made in an oval or elliptical shape e.g. FIGS. 15 and 16). In each case, the surface-perimeters are shaped to be substantially contiguous in appearance and sized to have a display-surface viewing area, of a panoramic type, over a wide-angle field extending up to a full 360° of azimuth, on which, substantially contiguous panoramic visual-media content and segmented visual-media content can be imaged. The exhibition means, for imaging and controlling contiguous panoramic visual-media content and segmented visual-media content on at least one of surface-perimeter of the display system is accomplished by the methods and means described in the text pertaining to FIG. 1. Additionally, materials used to make and support the screen-display 32 in FIG. 1 are also used in FIG. 11. Alternatively, the display 32 may be comprised of electronically-imaged display screens 44, or flexible pixelated material, according to the descriptions pertaining to FIG. 10.

FIG. 11 illustrates an embodiment of the invention that combines the aforementioned circumnavigable viewing features of screen-display 32 with a near-field, or close proximity, viewing functionality, distant-viewing functionality, and optionally provides such systems with means for viewer-participant interactivity. The embodiment illustrated in FIG. 11 is described in detail in a co-pending patent application of the applicant of the present invention, and is comprised of a plurality of workstations each having at least one CPU, at least one operating system, and at least one user input means, and at least one operating networking software application, which collectively provide computer-networked interactivity between at least one other similarly configured facility. The display system can readily be employed as a multimedia learning center for use in educational or research facilities, or in retail environments to increase awareness of products, services and/or activities. Other applications include use in command-and-control centers, or other environments where 360-degree, or panoramic, situational awareness is important, particularly in emergency conditions. For example: command-and-control-centers for military, firefighting, search-and-rescue, or other emergency-handling environments; control towers or flight control rooms; captains' bridges (in ships, submarines); radar surveillance aircraft, etc. Any of the preceding variants may also be equipped with exhibition means providing computer-networked interactivity between one or more individuals at the same facility or between one or more individuals located at a plurality of similarly configured facilities. It is to be noted that the panoramic image-content on screen-display 32 can also include a video inset showing a compass heading indicating which direction one is looking as, or before, image-content on the screen is panned (inset not shown).

Screen-display 32 is shown having a canted perimeter 42 to improve viewing from below the display and near-field viewing from a circularly arranged plurality of interactive viewer-participant participant stations 76. Display 32 and stations 76 are coaxially centered above circular platform 34, circular handrail 36, and circular walkway 38 and is seen in an elevated position being supported by positioning means 56. The positioning means are actuated by any one or more of a variety of known and available motion-control actuators, including but not limited to one or more: hydraulic actuators; motors or winches, or computer-automated stepper motors (or other motor type) in combination with: cables, belts and pulley(s), rack-and-pinion arrangements, connecting arms, cams, hydraulic arms; and the like. Thus, various, commonly known and available apparatus and methods for raising, lowering, or tilting, objects of a size and weight similar to exhibition means 28 are employable. For example, cables can be attached to display upper support means 110 (such as in FIG. 1) and the cable-tethered display can then be raised or lowered by one or more motors, including motors that are computer-controllable, or otherwise offer automated operation (such as winch operated cables). Alternatively, one or more hydraulically operated arm (preferably hidden from view) can be coupled to a portion of display 32 such as a display upper support means 110 to raise or lower the display as desired.

Screen-display 32 has at least one screen support means for supporting the shape of the display. For example, upper or lower edges of display 32 can be coupled to and supported by display support means. In FIG. 11 display 32 is coupled to and supported by a display upper support means 110. Alternatively, the display-surface viewing area of screen-display 32 can be formed of a rigid material suitable for rear-screen projections and supported by display lower support means 112 solely, or supported in combination with upper support means 110. The support means are formed of a rigid material and are sized and shaped to the desired dimensions of the screen-display 32 and can be coupled by any one or more of a variety of known coupling methods to a positioning means 56 (not shown). When positioning means 56 lifts exhibition means 28, the lower perimeter-edge 78 of screen-display 32 separates away from upper perimeter-edge 80 of the circular station-base 82. The range of movement offered by the positioning means is sufficient to raise the display to a height, and/or tilt it, to provide dual perspective viewing of an interior surface-perimeter 14 and an exterior surface-perimeter 16, as shown from vantage point 84 ("84" is encircled). The dashed lines in FIG. 11 are shown approximating a dual-perspective seen from station vantage point 84. In an upper position, the surface-perimeters of display 32 can be viewed from a plurality of interactive viewer-participant stations 76 and from numerous vantage points around the outer perimeter of screen-display 32 including views seen from circular walkway 38.

Alternatively screen-display 32 can be positioned coaxially within a self-supporting auxiliary display support means 70 that is sized and shaped similar to display 32 and made of a rigid transparent material (such as a plastic e.g. polycarbonate, or safety-glass). The transparent material has a thickness that provides rigidity sufficient to be a support means for supporting the shape of the screen-display. Thus, the display-surface viewing area of screen-display 32 can be comprised of a material commonly used for rear-projection screens and can be hung or suspended in a curtain-like fashion from an upper edge of auxiliary display support means 70 by a common coupling means (coupling not shown).

FIGS. 12–16 illustrate other embodiments of large-audience, positionable imaging and display system 10 for the imaging and exhibition of visual-media content, each comprising a screen-display 32 configured for the exhibition of panoramic imagery. As previously described, each display 32 has an interior surface-perimeter and an exterior surface-perimeter, wherein, each of the exterior surface-perimeters is preferably shaped to be substantially contiguous in appearance and sized to have a display-surface viewing area on which, substantially contiguous panoramic visual-media content and segmented visual-media content can be imaged. FIGS. 12–16 illustrate variants of screen-display 32 having positioning means 56 (or locating means) to position a display 32 for viewing by a multitude of people, and having internally-located exhibition means 28 (not shown), being applied in a number of commercially viable fashions. FIGS. 12–16 further illustrate advantages of the circumnavigably viewable screens of the present invention, particularly as applied to displays that can be viewed by large numbers of people and also viewed from a distance. Each screen-display 32 has a contiguous exterior surface-perimeter 16 made of a material sufficient to render rear-projection imagery thereon. The exhibition means, for imaging and controlling contiguous panoramic visual-media content and segmented visual-media content on a display surface-perimeter of the screen-display 32 is accomplished by the methods and means described in the text pertaining to FIG. 1. Screen-display material or composition can be the same material or composition described in the text pertaining to FIGS. 1–3 and 9–11 or be comprised of a material or composition commonly used in outdoor settings. Additionally, one or more transparent, or semi-transparent covering may be applied to the exterior surface-perimeter 16 of displays to enhance the durability or longevity of the displays. Alternatively, exterior surface-perimeter 16 of a screen-display 32 can be coaxially aligned adjacent to an auxiliary exterior surface-perimeter 70 wherein the latter is comprised of a material that is transparent, or semi-transparent, and can also be comprised of a material suitable for the retention of one or more gases.

Figure 12:
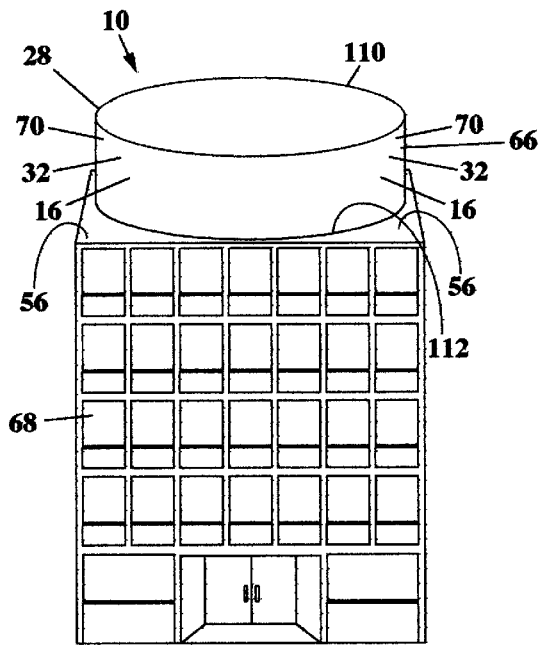
FIG. 12 shows an architecturally integrated embodiment of the invention wherein a building provides a screen-height positioning means, illustrating a display that can be seen from a distance by a multiplicity of viewers and can be integrally formed within, or adjacent to, an architectural structure, and can be integrated such that views of an interior surface-perimeter of the panoramic display are viewable by people within the architectural structure.

In one embodiment, the screen-display 32 in FIG. 12 can be placed next to a self-supporting auxiliary display support means 70 having a size and shape that is similar to display 32 e.g. annularly-shaped, or comprised of annular segments positioned adjacent to one another, and made of a rigid transparent material such as a plastic (e.g. polycarbonate), or safety-glass. The transparent material has a thickness that provides a rigidity and durability sufficient to be a support means for supporting the shape of the screen-display. For example, the surface-perimeter(s) of screen-display 32 can be comprised of a material commonly used for rear-projection screens, or flexible pixelated material, and can be hung or suspended in a curtain-like fashion from an upper edge of auxiliary display support means 70 by suitable coupling means (coupling not shown). Alternatively, display 32 can be suspended in a curtain-like fashion from display upper support means 110 (as previously described) and simply be positioned in close proximity to a self-supporting auxiliary display support means 70. For example, an architectural structure could have a typical glass exterior and the combination of display 32 and upper support means 110 could be positioned closely thereto.

Alternatively, screen-display 32 can be positioned coaxially within a transparent surface-perimeter 66 that is sized and shaped similar to the display-surface viewing area of display 32 and is made of a material suitable for retaining one or more gases and is suitable for forming a section of a balloon or airship. The transparent material has a thickness sufficient to be a support means for supporting the shape of the screen-display.

Thus, the display-surface viewing area of screen-display 32 can be comprised of a material commonly used for rear-projection screens. Alternatively, display 32 can be suspended in a curtain-like fashion from the perimeter of display upper support means 110 (as previously described) and/or means 110 can be coaxially positioned within transparent surface-perimeter 66.

In another embodiment, the positioning means of FIG. 12 can be internally coupled to and support a display upper support means 110 (not shown), and can optionally be coupled to and supported by display lower support means 112. In either case, the support means are sized and shaped to the desired dimensions of the screen-display 32 and can be coupled by any one or more of a variety of known coupling methods to the positioning means. For example, one or more horizontal cross-member can extend across an upper diameter of the display in FIG. 12 being coupled at both ends to display upper support means 110. In which case, the horizontal member connected to support member 110, can be supported by at least one vertical support member near the member's centerpoint, or by a plurality of such vertical support members.

Numerous variations of architectural structure 68 can be built, each having a different cross-section which is readily accommodated by a screen-display having a complementary cross-section. For example, architectural structure 68 can be cylindrically shaped, and a screen-display 32 having a matching cylindrically shaped cross-section can be aesthetically incorporated into the design of the building. In such a case, display 32 (and respective exhibition means) can be integrated above, or between, one or more floor of the building—and the building itself serves as a primary positioning means 56 of the screen-display(s). It is noted that such configurations can also provide numerous vantage points from within an architectural structure from which to view an interior surface-perimeter of such screen-display embodiments.

Figure 13:
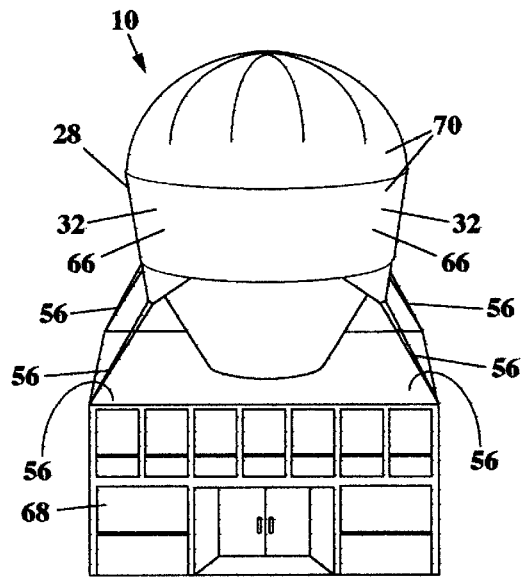
FIGS. 13 through 16 show various outdoor commercial embodiments of the invention using pressurized air, or lighter-than-air gas, screen-height positioning means for supporting and positioning screens to provide a multitude of vantage points from which to view portable, or mobile, panoramic displays, including display systems that can be viewed by a multiplicity of viewers from a distance.
Figure 14:
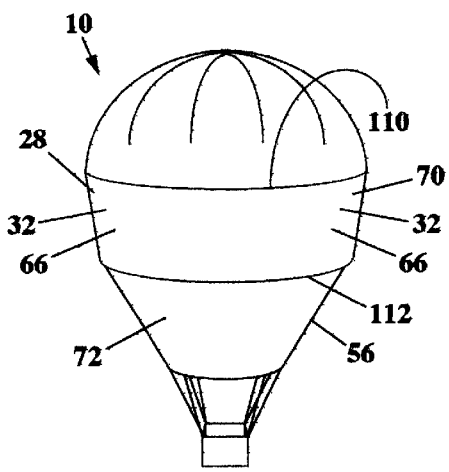
Figure 15:
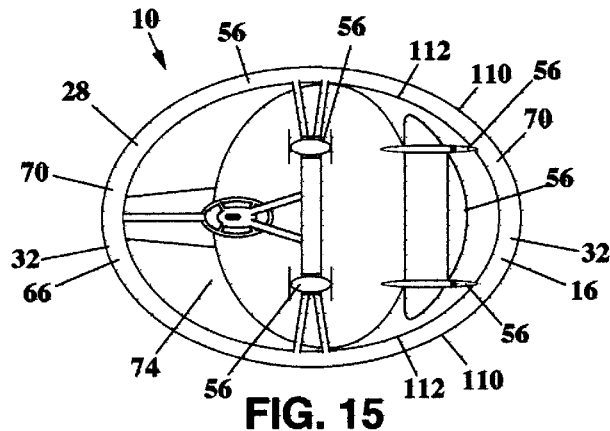
Figure 16:
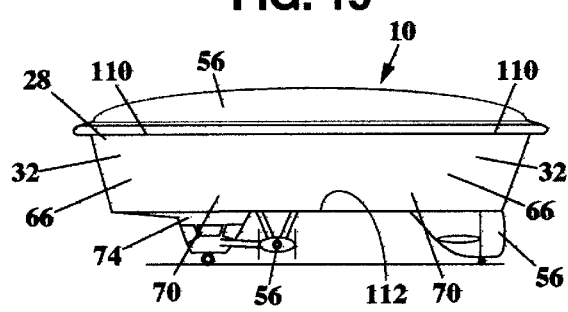

FIG. 12 shows screen-display 32 elevated above ground level and positioned on the top of architectural structure 68. In FIG. 13, screen-display 32 is integrated into, a pressurized balloon-shaped commercial display fixed, by positioning means 56 to the top of an architectural structure 68 (such as a building). Alternatively, this system could exhibit dome-shaped projections when configured with dome-shaped projection means (as depicted in FIG. 9). It is also noted that portions of balloon-shaped display below transparent surface-perimeter 66 can also be comprised of a transparent material in which case imagery on display 32 will be both exteriorly and interiorly viewable (when seen from below e.g. through a ceiling sky-light). FIGS. 14–16 show lighter-than-air craft (balloon 72 in FIG. 14; and, airship 74 seen from below in FIG. 15 and from a side view in FIG. 16). Both the balloon 72 and airship 74 are shown incorporating screen-display 32 (having internally co-located exhibition means 28) and offer a mobile screen positioning means 56 to position screen-displays to at least one height relative to a viewing audience to provide a multitude of vantage points from which to view at least one of its surface-perimeters.

Each screen-display 32 illustrated in FIGS. 12 through 16 can be positioned coaxially within a transparent surface-perimeter 66 of a gas-filled display apparatus that is sized and shaped similar to the display-surface viewing area of a display 32. Transparent surface-perimeter 66 is made of a material suitable for retaining one or more gases (e.g. one or more pressurized gas, or one or more heated gases, or a lighter-than-air gas) and is suitable for forming one or more section of a gas-filled display apparatus such as a balloon, or airship. The transparent material preferably has a strength sufficient to also be a support means for supporting the shape of the screen-display and accompanying internal components of the exhibition means (e.g. projectors and multimedia playback means). Thus, the display-surface viewing area of screen-display 32 can be comprised of a material commonly used for rear-screen projection and can be co-located within a resilient transparent 'skin' which is an integral part of a gas-filled display apparatus. Alternatively, display 32 can be suspended in a curtain-like fashion from the perimeter of display upper support means 110 (as previously described) such that the combination of means 110 and display 32 can be coaxially positioned within transparent surface-perimeter 66. While surface-perimeter 66 has been described as being transparent, it is also noted that a translucent material otherwise having similar characteristics could alternatively be used.

Figure 17:
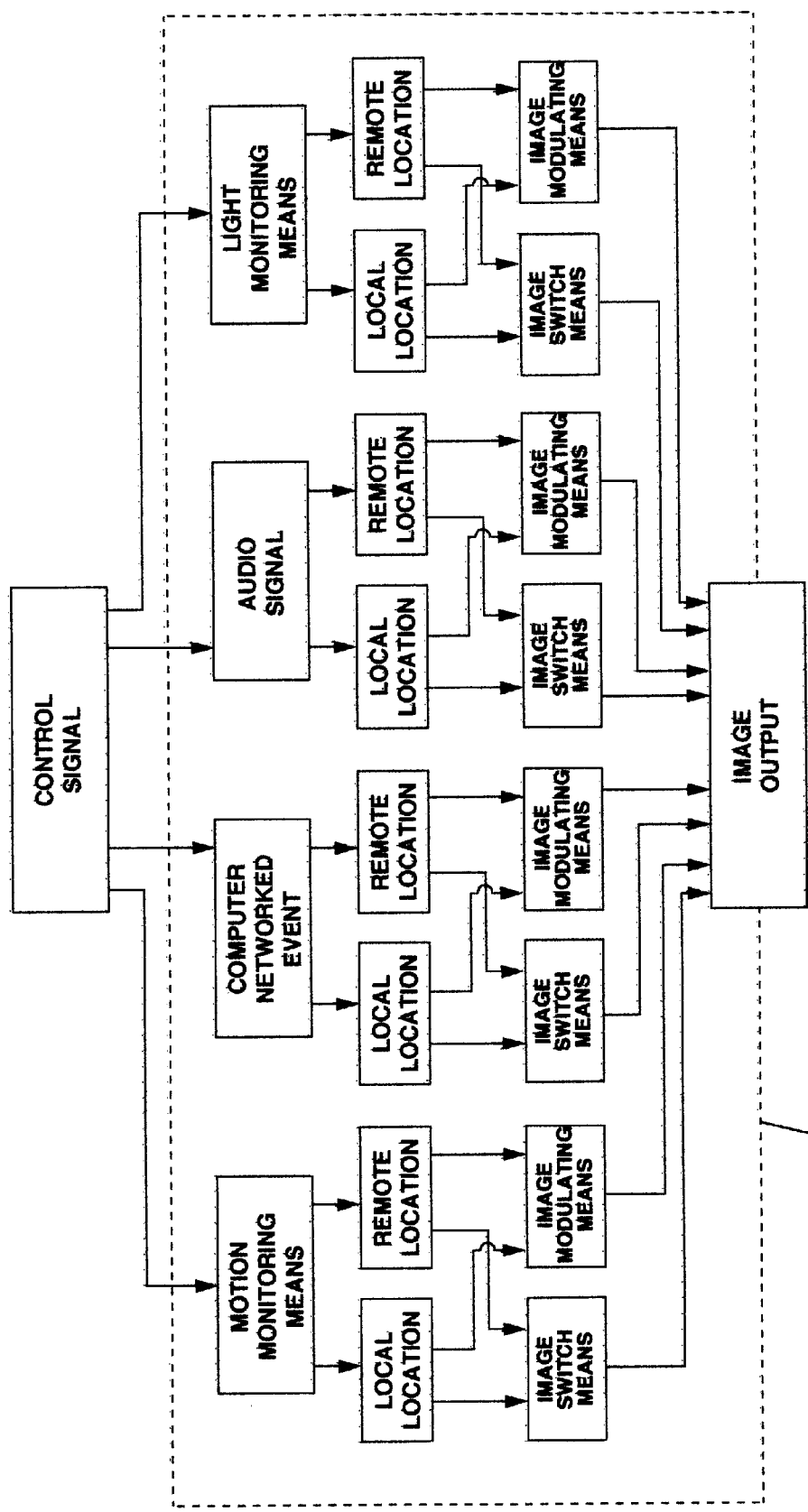
FIG. 17 is a block diagram of a video image processing means depicting a variety of control signals that can be remotely or locally acquired to switch or modulate image output.

In addition to exhibition means that can incorporate available and known apparatus for video image processing, the present invention optionally provides an alternative video image processing means 50 which is depicted in the block diagram of FIG. 17. The processing means is shown acquiring control signals (represented by lines, each having an arrowhead) derived from a motion monitoring means, computer networked events, audio signals, or light monitoring means—whether acquired from a local location or one or more remote locations. Although four basic types of stimuli are received, it is noted that an image processing means can alternatively be equipped to receive one, two, or three of such electronic stimuli. In each case, received stimuli is conveyed by any one or more of a variety of signal transmission means to one or more image switching means and/or image modulation means which in turn provides image switched and/or image-modulated output. The image-processing means 50 is preferably comprised of at least one CPU, at least one operating system, and at least one input stimulus monitoring means, which collectively monitor and respond to at least one of the types of input stimuli.

In the first case, wherein the control signal is derived from a motion monitoring means at a local or remote location(s), one or more entertainer such as a performance artist, or one or more audience-participants are monitored for movement, for example by a Global Positioning Satellite (GPS) device which transmits latitude and longitude information to either a image switching means in which case a pre-determined sequence of images, or a random sequence of images, is triggerable or switched according to the monitored motion and desired conditions thereof, or the motion information is conveyed to an image modulating means which then modulates one or more image using any one or more of a variety of known image adjustment means such as contrast, brightness, luminance, saturation, hue, chroma-keying, lumi-keying, algorithmic image filters and/or imagealtering plug-ins and the like. Alternatively, the motion monitoring means can be comprised of any one or more of a variety of known electromechanical, or electro-optical, switches that are triggerable or interruptible by body movements when worn, or by physical contact, or proximity switching, from one or more interactive participant. For example, any one or more of following known switching means can be employed using: transducers, piezo elements, strain gauges, electro-fluid switches; light proximity switches, infrared beam switches, or simple mechanically activated normally-opened or normally-closed electric switches and the like. Thus, when a participant, entertainer, dancer, or performance artist moves, for example within a prescribed manner—whether the stimulus is received from a networked remote location or at the location where an image delivery and display system is located—the image output is controllable or predictable relative to that human action. Similarly, a motion monitoring means can be configured to provide control signal responsive to real-time movement conditions such as the velocity; degree; amount; speed; frequency and/or intensity of movement, each of which can be sensed by available motion monitoring and reporting means and employed as image output triggers. Monitorable motion changes are transmitted through suitable signal transmission means (e.g. wire, fiber optic cable, or wireless transmissions, etc.) to image processing means 50 to provide control signal to image switch means and/or image modulation means to affect image output.

In the second case, wherein the control signal is derived from one or more computer networked event (FIG. 17) initiated locally, or from a remote location(s), either:

A.) real-time user-participant input initiated by a computer, wireless handheld device, or other, interface means (e.g. keyboard input, mouse input, speech recognition software, and/or wireless interface means input, e-mail transmittable data, and the like), or other digital instrument interface means such as any one or more of a variety of CPU-integrated apparatus such as wireless handheld devices (including cell phones and/or pagers), MIDI instruments or controllers, light-controllers, and the like, or B.) pre-programmable input such as cue points that can be positioned and recorded in a multimedia software application (e.g. synchronously with audio, SMPTE, MIDI and other known timecode based and/or sequencing systems), is conveyed by the networkable computer(s) and suitable transmission means (by wire, fiber optic cable, or by wireless transmission) to an image switch means or an image-modulating means to effect image output.

For example in the real-time interaction, one or many networked participants can be required to input a predetermined condition, or reach a measurable threshold, in order to effect a change in the image output. Alternatively, computer interface means at one or more location can be used to select images from a database of images, or users can control on-screen image(s) through their respective interface/control means e.g. a horizontal cursor motion can control pan and a vertical cursor motion can control tilt. Optionally, a computer generated event can include image sample recognition, such that a computer monitors and analyzes projected or display images until a pre-determined image occurs and is recognized which then triggers an image switching or image modulation of respective image output.

In the third case in FIG. 17, the control signal, or stimulus, is derived from one or more monitorable audio signals at a local or remote location. For example, one or more entertainer such as a musician, performance artist, or one or more audience-participants (or other audible condition e.g. sound effect, voice phone call, computer-encoded sound, amplified, or acoustic-level sound) and the like are monitored for audio amplitude, frequency, voice and/or audio sample recognition information to control an image switching means or image modulating means. When monitored from a local, or remote location, selectable audio stimuli can be used for initiating or synchronizing image switching, for example to use one or more audio event to trigger-switch a pre-determined sequence of images, or a random sequence of images, according to the monitored audio signal and desired conditions thereof. For example, each time a particular drum is hit contiguous panoramic visual-media content or segmented visual-media content appearing on at least one display 32 is simultaneously switched. Similarly, when monitorable audio signal stimulus is conveyed to an image modulating means, then any one or more of a variety of known image modulation effects can be triggered. For example, such monitorable audio triggers can change image: size, shape, aspect ratio, contrast, brightness, luminance, saturation, hue, chroma-keying, lumi-keying, masking, morphing, algorithmic image filtering and/or image-altering plug-ins, and so forth.

The audio stimulus monitoring means can be comprised of any one or more of a variety of known audio capturing, sensing and processing equipment. Such equipment can include, audio mixing, capturing means (e.g. one or more microphones), amplifying, sensing and/or measuring apparatus, including audio circuitry signal monitoring means, can be used. In the latter case, predetermined or programmable thresholds reached within audio circuit stage provide signal triggers. For example, image output can be responsive to signal derived from one or more audio circuit stage of an audio envelope such as the attack, sustain, decay and release stages (ASDR) or digital and/or electronic representations thereof. Optionally, a audio signal event can include sound sample recognition, such that a computer monitors and analyzes incoming sound signal input until a pre-determined sound occurs and is recognized which then triggers an image switching or image modulation of image output. Thus, when a participant, entertainer, performance artist, or musician produces or re-produces sound in a prescribed manner—whether the sound is generated at and monitored from a remote location or is locally monitored where an image delivery and display system is installed—the image output is controllable relative to definable audio parameters. Monitorable changes in audio are transmitted through suitable signal transmission means (e.g. wire, fiber optic cable, or wireless transmissions, etc.) to image processing means 50 to provide control signal to image switch means and/or image modulation means to affect image output.

In the fourth case, a light monitoring means (FIG. 17) is employed in a manner similar to the aforementioned motion and audio monitoring means and the triggering of control signals therefrom to control image output. Light monitoring means can be locally or remotely located to monitor light conditions and changes, such as ambient light, daylight, nightlight, stage lights, spot lights, and/or changes in frequency (color) or intensity of one or more lights. Monitorable changes in lighting are monitored and the control signal is transmitted through suitable signal transmission means (e.g. wire, fiber optic cable, or wireless transmissions, etc.) to image processing means 50 to provide control signal to image switch means and/or image modulation means to affect image output. Such control signals can be responsive to pre-programmed, pre-determined, or real-time light conditions and can be monitored and initiated from any of a variety of known electronic light-sensing means such as cameras, photometers and/or photo-optical sensors.

Many modifications and variations of the present invention are possible in the light of the above teachings. It is therefore to be understood that in the scope of the appended claims the invention may be practiced otherwise than as specifically described.

What is claimed is:

1. A large-audience, positionable imaging and display system for the imaging and exhibition of visual-media content, comprising:

a.) a screen-display configured for the exhibition of panoramic imagery having an interior surface-perimeter and an exterior surface-perimeter, wherein,
   each of said surface-perimeters is shaped and sized to be substantially contiguous in appearance and to have a display-surface viewing area of a panoramic type, over a wide-angle field extending up to a full 360° of azimuth, on which, substantially contiguous panoramic visual-media content and segmented visual-media content can be imaged;

b.) at least one screen support means for supporting the shape of said screen-display;

c.) screen positioning means to position said screen-display to at least one height relative to a viewing audience to provide a multitude of vantage points from which to view at least one of said surface-perimeters; and, d.) exhibition means for imaging and controlling said contiguous panoramic visual-media content and said segmented visual-media content on at least one of said surface-perimeters.

2. A large-audience, positionable imaging and display system for the imaging and exhibition of visual-media content, comprising:
   a.) a screen-display configured for the exhibition of panoramic imagery having an interior surface-perimeter and an exterior surface-perimeter, wherein,
      each of said surface-perimeters is shaped and sized to be substantially contiguous in appearance and to have a display-surface viewing area of a panoramic type, over a wide-angle field extending up to a full 360° of azimuth, on which, substantially contiguous panoramic visual-media content and segmented visual-media content can be imaged;
   b.) at least one screen support means for supporting the shape of said screen-display;
   c.) screen positioning means to position said screen-display to at least one height relative to a viewing audience to provide circumnavigable viewing of the screen-display, and to provide a multitude of vantage points exterior to an outermost perimeter of said display, from which to view at least one of said surface-perimeters; and,
   d.) exhibition means for imaging and controlling said contiguous panoramic visual-media content and said segmented visual-media content on at least one of said surface-perimeters.

3. A large-audience, positionable imaging and display system for the imaging and displaying of visual-media content, comprising:
   a.) a panoramic arced-screen segment configured for the imaging of arced-panoramic imagery having an interior surface-perimeter and an exterior surface-perimeter, wherein
      each of said surface-perimeters are substantially contiguous in appearance and are sized and shaped as a display on which, substantially-contiguous arced-panoramic visual-media content and segmented visual-media content can be imaged;
   b.) at least one screen support means for supporting the shape of said display;
   c.) at least one screen positioning means to position said display to at least one height relative to a viewing audience to provide circumnavigable viewing of the display, and to provide a multitude of vantage points from which to view at least one of said surface-perimeters;
   d.) visual-media content exhibition means for imaging and controlling said contiguous panoramic visual-media content and said segmented visual-media content on at least one of said surface-perimeters, and,
   e.) an array of speakers that are positionable around a perimeter of said display, wherein each of said speakers are driven by an audio amplifier connected with at least one audio source to provide a sound-system.

4. The large-audience, positionable imaging and display system of claim 1 wherein at least one of said surface-perimeters of said screen-display is comprised of a material suitable for rear-projection and is supported by at least one of said support means in alignment with the projected fields of a plurality of projectors.

5. The screen-display of claim 4 wherein said material suitable for rear-projection is comprised of a flexible and substantially contiguous piece of material.

6. The screen-display of claim 4 wherein said screen is comprised of a plurality of screen segments that are sized and shaped for quick assembly and disassembly and are supportable adjacent to one another to be substantially contiguous in appearance by at least one of said screen support means.

7. The large-audience, positionable imaging and display system of claim 1 wherein at least one of said surface-perimeters of said display system is comprised of a transparent material having a rigidity sufficient to form a self-supporting auxiliary display support means having a surface-perimeter which coaxially receives and supports a similarly shaped rear-projection screen material.

8. The large-audience, positionable imaging and display system of claim 1 wherein at least one portion of said surface-perimeters of said screen-display is comprised of a material suitable for retaining one or more gases and is suitable for forming a section of a balloon or airship, and said transparent material has a strength sufficient to also be a support means for supporting the shape of the screen-display.

9. The large-audience, positionable imaging and display system of claim 1 wherein said exhibition means is comprised of panoramic imaging apparatus consisting of a ring of outward-facing projectors.

10. The large-audience, positionable imaging and display system of claim 1 wherein said exhibition means is comprised of panoramic imaging apparatus consisting of a ring of inward-facing projectors.

11. The large-audience, positionable imaging and display system of claim 1 wherein said exhibition means is comprised of panoramic imaging apparatus consisting of at least one electronically-imaged display screen composed of pixel elements.

12. The large-audience, positionable imaging and display system of claim 1 wherein said exhibition means is comprised of panoramic image-capturing apparatus consisting of a ring of outward-facing cameras.

13. The large-audience, positionable imaging and display system of claim 1 wherein said exhibition means is comprised of panoramic image-capturing apparatus consisting of a ring of inward-facing cameras.

14. The screen-display, screen support means, and screen positioning means of claim 1, whereby said screen-display is positioned to at least one height relative to an audience to provide a multitude of dual-perspective vantage points each offering views of said screen-display having a circularity-of-action, such that an object that is seen to travel from left to right on a nearer exterior surface-perimeter of said display-screen will be seen travelling right to left on the further interior surface-perimeter of the same screen-display.

15. The large-audience, positionable imaging and display system of claim 1 wherein said exhibition means is comprised of at least one image-processing means.

16. The image-processing means of claim 15 further comprising at least one CPU, at least one operating system, and at least one input-controller means, and at least one panoramic game software application which collectively render panoramic video game imagery suitable for dual-perspective imaging by said exhibition means, wherein
   said image-processing means is responsive to the input from a hand-controllable interface of at least one game controller device such that hand adjustments of the device interface cause predictable outcomes to the scene elements and environments that make up a panoramic game seen on said screen-display.

17. The image-processing means of claim 15 further comprising at least one CPU, at least one operating system, and at least one input stimulus monitoring means, which collectively monitor and respond to at least one type of input stimuli to provide image switch means that change panoramic screen-display imagery according to controllable input parameters.

18. The at least one CPU, operating system, and panoramic game software application of claim 16 comprising software routines to seamlessly edge-match an array of video segments, including, game backgrounds, environments, moving objects and other scene elements, when any or all of such are moving from, transitioning from, or overlapping between, one panoramic portion of the screen-display of said system to another panoramic portion of the screen-display.

19. The at least one CPU, operating system, and panoramic game software application of claim 16 comprising software routines which collectively render panoramic video game imagery suitable for dual-perspective imaging by exhibition means of said system.

20. The large-audience, positionable imaging and display system of claim 1 further comprising at least one CPU, at least one operating system, at least one user input means, and at least one operating networking software application, which collectively are responsive to user input from a plurality of workstations and provide networked interactivity between at least one other similarly configured facility.

21. The large-audience, positionable imaging and display system of claim 1 wherein said exhibition means further comprises image-processing means suitable for transmitting a plurality of live video content signal derived from a plurality of cameras at one location via suitable transmission means to a like-numbered plurality of projectors of said display system at the same location.

22. The large-audience, positionable imaging and display system of claim 1 wherein said exhibition means further comprises image-processing means suitable for transmitting a plurality of live video content signal derived from a plurality of cameras at one location via suitable transmission means to a like-numbered plurality of projectors of said display system at least one other location.

23. The large-audience, positionable imaging and display system of claim 1 wherein said screen-display is configured having at least one rectangular accent screen mounted in close proximity to said screen-display.

24. The positioning means of the large-audience, positionable imaging and display system of claim 1 comprising at least one computer-automated stepper motor.

25. The positioning means of the large-audience, positionable imaging and display system of claim 1 comprising at least one hydraulic actuating means.

26. The positioning means of the large-audience, positionable imaging and display system of claim 1 comprising a gas-filled display apparatus.

27. The large-audience, positionable imaging and display system of claim 1 wherein said exhibition means is comprised of panoramic image-capturing apparatus consisting of an aligned array of cameras.

28. The large-audience, positionable imaging and display system of claim 1 wherein said exhibition means further comprises image-processing means suitable for transmitting a plurality of video content signal derived from a pre-recorded source via suitable transmission means to a like-numbered plurality of projectors of said display system.

29. The large-audience, positionable imaging and display system of claim 1 wherein at least one of said screen-display is incorporated into an architectural structure.

30. The sound system of said large-audience, positionable imaging and display system of claim 3 wherein each of said speakers are driven by an audio amplifier connected with a plurality of audio sources to provide as desired, a panning of audible sound therefrom.

* * * * *

INTER PARTES REEXAMINATION CERTIFICATE (1076th)
United States Patent
Metcalf

(10) Number: US 6,669,346 C1
(45) Certificate Issued: Mar. 23, 2015

(54) LARGE-AUDIENCE, POSITIONABLE IMAGING AND DISPLAY SYSTEM FOR EXHIBITING PANORAMIC IMAGERY, AND MULTIMEDIA CONTENT FEATURING A CIRCULARITY OF ACTION

(75) Inventor: Darrell J. Metcalf, Fillmore, CA (US)

(73) Assignee: Large Audience Display Systems, LLC, Tyler, TX (US)

Reexamination Request:
No. 95/001,817, Nov. 21, 2011

Reexamination Certificate for:
Patent No.: 6,669,346
Issued: Dec. 30, 2003
Appl. No.: 09/853,915
Filed: May 12, 2001

Related U.S. Application Data

(60) Provisional application No. 60/204,024, filed on May 15, 2000.

(51) Int. Cl.
*G01B 21/26* (2006.01)
*G03B 21/00* (2006.01)
*G03B 31/00* (2006.01)
*G03B 37/00* (2006.01)
*G09B 19/16* (2006.01)
*G03B 37/04* (2006.01)

(52) U.S. Cl.
CPC ..................... *G03B 37/04* (2013.01)

USPC ................... 353/94; 352/34; 352/69

(58) Field of Classification Search
None
See application file for complete search history.

(56) References Cited

To view the complete listing of prior art documents cited during the proceeding for Reexamination Control Number 95/001,817, please refer to the USPTO's public Patent Application Information Retrieval (PAIR) system under the Display References tab.

*Primary Examiner* — Kenneth J Whittington

(57) ABSTRACT

A panoramic imaging and display system for the imaging and displaying of visual-media content, comprising a screen configured for the display of panoramic imagery, having an interior surface-perimeter and an exterior surface-perimeter, wherein each of said surface-perimeters are substantially contiguous in appearance and are sized and shaped to have a display area on which, substantially contiguous panoramic visual-media content and segmented visual-media content can be imaged. The system provides support and positioning of the display to at least one height relative to a viewing audience to provide circumnavigable viewing, and a multitude of vantage points from which to view at least one of the surface-perimeters of the panoramic display. Embodiments of the system can have an array of speakers positioned around a perimeter of the system's screen as a sound-system providing a panning of audible sound which can be synchronized with the movement of objects seen moving on the screen.

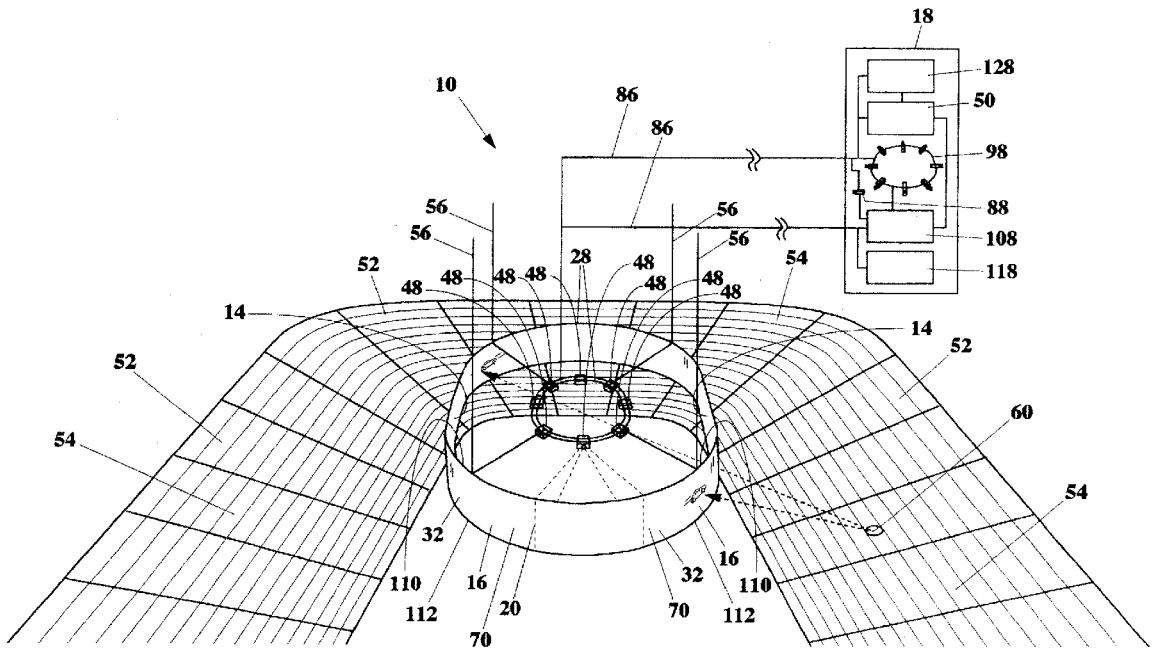

US 6,669,346 C1

INTER PARTES REEXAMINATION CERTIFICATE ISSUED UNDER 35 U.S.C. 316

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1-6, 9, 10, 13-15, 17, 24 and 28 are cancelled.

New claims 31-46 are added and determined to be patentable.

Claims 7, 8, 11, 12, 16, 18-23, 25-27, 29 and 30 were not reexamined.

31. *The large-audience, positionable imaging and display system of claim 1, further comprising image processing means configured for switching and/or modulating one or more time code-synchronized and adjacently edge-matched visual-media content segments of a substantially contiguous panorama exhibited on one or more screen-displays at one or more local or remote locations, wherein, the switching and/or modulating is based on one or more local or remote control signals generated by one or more of the following: motion monitoring means and/or a GPS device sensing a motion made by one or more entertainers or one or more audience-participants at a large-audience venue; a computer networked event responsive to a communication sent from a wireless handheld device or cell phone of a large-audience venue attendee; audio stimulus monitoring means sensing a sound associated with one or more entertainers or audience-participants at a large-audience venue in accordance with predetermined, definable or programmable audio parameters; light monitoring means sensing a change in frequency and/or intensity of a lighting condition at a large-audience venue; and combinations thereof.*

32. *A large-audience, positionable imaging and display system for the imaging and exhibition of visual-media content, comprising:*

*a screen-display configured for the exhibition of panoramic imagery having an interior surface-perimeter and an exterior surface-perimeter, wherein each of said surface-perimeters is shaped and sized to be substantially contiguous in appearance and each of said surface-perimeters has display-surface viewing area of a panoramic type, over a wide-angle field extending up to a full 360° of azimuth, on which, substantially contiguous panoramic visual-media content and segmented visual-media content can be imaged;*

*at least one screen support means for supporting the shape of said screen-display;*

*screen positioning means to position said screen-display to at least one height relative to a viewing audience to provide a multitude of vantage points from which to view at least one of said surface-perimeters; and*

*exhibition means for imaging and controlling said contiguous panoramic visual-media content and said segmented visual-media content on at least one of said surface-perimeters;*

*wherein the exhibition means comprises a plurality of projectors, wherein a first projector of the plurality of projectors projects visual media content on the exterior surface-perimeter or the interior surface-perimeter and wherein a second projector of the plurality projectors projects a different visual-media content on the opposite surface-perimeter.*

33. *A large-audience, positionable imaging and display system for the imaging and exhibition of visual-media content, comprising:*

*a screen-display configured for the exhibition of panoramic imagery having an interior surface-perimeter and an exterior surface-perimeter, wherein each of said surface-perimeters is shaped and sized to be substantially contiguous in appearance and each of said surface-perimeters has a display-surface viewing area of a panoramic type, over a wide-angle field extending up to a full 360° of azimuth, on which, substantially contiguous panoramic visual-media content and segmented visual-media content can be imaged;*

*at least one screen support means for supporting the shape of said screen-display;*

*screen positioning means to position said screen-display to at least one height relative to a viewing audience to provide a multitude of vantage points from which to view at least one of said surface-perimeters; and*

*exhibition means for imaging and controlling said contiguous panoramic visual-media content and said segmented visual-media content on at least one of said surface-perimeters;*

*wherein the exhibition means comprises a plurality of projectors, and wherein at least two of the plurality of projectors, are equipped to selectively project the same visual-media content on the same portion of at least one of the surface-perimeters.*

34. *A large-audience, positionable imaging and display system for the imaging and exhibition of visual-media content, comprising:*

*a screen-display configured for the exhibition of panoramic imagery having an interior surface-perimeter and an exterior surface-perimeter, wherein each of said surface-perimeters is shaped and sized to be substantially contiguous in appearance and each of said surface-perimeters has a display-surface viewing area of a panoramic type, over a wide-angle field extending up to a full 360° of azimuth, on which, substantially contiguous panoramic visual-media content and segmented visual-media content can be imaged;*

*at least one screen support means for supporting the shape of said screen-display;*

*screen positioning means to position said screen-display to at least one height relative to a viewing audience to provide a multitude of vantage points from which to view at least one of said surface-perimeters; and*

*exhibition means for imaging and controlling said contiguous panoramic visual-media content and said segmented visual-media content on at least one of said surface-perimeters;*

*wherein the exhibition means comprises a plurality of projectors, wherein a first projector of the plurality of projectors projects imagery on the exterior surface-perimeter or the interior surface-perimeter, and wherein a second projector of the plurality projectors projects a different image on the opposite surface perimeter.*

35. *A large-audience, positionable imaging and display system for the imaging and exhibition of visual-media content, comprising:* a screen-display configured for the exhibition of panoramic imagery having an interior surface-perimeter and an exterior surface-perimeter, wherein each of said surface-perimeters is shaped and sized to be substantially contiguous in appearance and each of said surface-perimeters has a display-surface viewing area of a panoramic type, over a wide-angle field extending up to a full 360° of azimuth, on which, substantially contiguous panoramic visual-media content and segmented visual-media content can be imaged;

at least one screen support means for supporting the shape of said screen-display;

screen positioning means to position said screen-display to at least one height relative to a viewing audience to provide a multitude of vantage points from which to view at least one of said surface-perimeters;

exhibition means for imaging and controlling said contiguous panoramic visual-media content and said segmented visual-media content on at least one of said surface-perimeters; and video image processing means equipped for processing visual-media content, wherein the visual-media content comprises at least live video and/or recorded video of HD video quality, or less than HD video quality; the panoramic visual-media content comprising a plurality of video image segments of the at least live and/or recorded video, and the video image processing means further equipped to synchronize, render adjacently displayable and edge-match the plurality of video image segments in conformance with the size and shape of the display-surface viewing area, when exhibited for the large audience, and when extending up to the 360 degrees, or the less than 360 degrees.

36. A large-audience, positionable imaging and display system for the imaging and exhibition of visual-media content, comprising:

a screen-display configured for the exhibition of panoramic imagery having an interior surface-perimeter and an exterior surface-perimeter, wherein each of said surface-perimeters is shaped and sized to be substantially contiguous in appearance and each of said surface-perimeters has a display-surface viewing area of a panoramic type, over a wide-angle field extending up to a full 360° of azimuth, on which, substantially contiguous panoramic visual-media content and segmented visual-media content can be imaged;

at least one screen support means for supporting the shape of said screen-display;

screen positioning means to position said screen-display to at least one height relative to a viewing audience to provide a multitude of vantage points from which to view at least one of said surface-perimeters; and exhibition means for imaging and controlling said contiguous panoramic visual-media content and said segmented visual-media content on at least one of said surface-perimeters;

wherein the screen-display is sized greater in diameter than in height and configured to be at least vertically positionable before the large audience located at least in an inward-facing seating arrangement of varied-height rows of seats in a large-audience venue, wherein a lower positioning of the screen-display provides at least one viewer of the large audience located in one or more lower rows a single-perspective view of a side portion of the exterior surface-perimeter, and a higher positioning of the screen-display provides at least one or more viewer of the large audience a dual-perspective view of a nearer portion of the exterior surface-perimeter and a further portion of the interior surface-perimeter.

37. A large-audience, positionable imaging and display system for the imaging and exhibition of visual-media content, comprising:

a screen-display configured for the exhibition of panoramic imagery having an interior surface-perimeter and an exterior surface-perimeter, wherein each of said surface-perimeters is shaped and sized to be substantially contiguous in appearance and each of said surface-perimeters has a display-surface viewing area of a panoramic type, over a wide-angle field extending up to a full 360° of azimuth, on which, substantially contiguous panoramic visual-media content and segmented visual-media content can be imaged, at least one screen support means for supporting the shape of said screen-display;

screen positioning means to position said screen-display to at least one height relative to a viewing audience to provide a multitude of vantage points from which to view at least one of said surface-perimeters; and exhibition means for imaging and controlling said contiguous panoramic visual-media content and said segmented visual-media content on at least one of said surface-perimeters;

wherein the screen-display is sized greater in diameter than in height and configured at least vertically positionable before an audience located at least in an inward-facing seating arrangement of varied-height rows of seats typical of large-audience venues, wherein a higher positioning of the display-screen provides each among a multitude of viewers located in higher rows a single-perspective view of a side portion of the exterior surface-perimeter while simultaneously providing each among a different multitude of viewers located in lower rows a dual-perspective view of a nearer exterior side portion and a further interior side portion of both of the surface-perimeters, and wherein a lower positioning of the screen-display provides each among a multitude of viewers located in lower rows a single-perspective view while simultaneously providing each among a multitude of viewers located in higher rows a dual-perspective view of a nearer portion of the exterior surface-perimeter and a further portion of the interior surface-perimeter.

38. A large-audience, positionable imaging and display system for the imaging and exhibition of visual-media content, comprising:

a screen-display configured for the exhibition of panoramic imagery having an interior surface-perimeter and an exterior surface-perimeter, wherein each of said surface-perimeters is shaped and sized to be substantially contiguous in appearance and each of said surface-perimeters has a display-surface viewing area of a panoramic type, over a wide-angle field extending up to a full 360° of azimuth, on which, substantially contiguous panoramic visual-media content and segmented visual-media content can be imaged;

at least one screen support means for supporting the shape of said screen-display;

screen positioning means to position said screen-display to at least one height relative to a viewing audience to provide a multitude of vantage points from which to view at least one of said surface-perimeters;

exhibition means for imaging and controlling said contiguous panoramic visual-media content and said segmented visual-media content on at least one of said surface-perimeters; and 3D image-capturing means and 3D image-processing means, wherein the 3D image-capturing means comprises a plurality of video cameras equipped to capture at least two adjacent panoramic segments and communicate the captured segments via a physical connection or wireless communication; the 3D image-processing means equipped to process the captured adjacent panoramic segments as live or pre-recorded 3D imagery for exhibition on one or more types of panoramic screens, displays of a type suitable for 3D viewing or for viewing with stereoscopic glasses.

39. A large-audience, positionable imaging and display system for the imaging and exhibition of visual-media content, comprising:
   a screen-display configured for the exhibition of panoramic imagery having an interior surface-perimeter and an exterior surface-perimeter, wherein each of said surface-perimeters is shaped and sized to be substantially contiguous in appearance and each of said surface-perimeters has a display-surface viewing area of a panoramic type, over a wide-angle field extending up to a full 360° of azimuth, on which, substantially contiguous panoramic visual-media content and segmented visual-media content can be imaged;
   at least one screen support means for supporting the shape of said screen-display;
   screen positioning means to position said screen-display to at least one height relative to a viewing audience to provide a multitude of vantage points from which to view at least one of said surface-perimeters; and
   exhibition means for imaging and controlling said contiguous panoramic visual-media content and said segmented visual-media content on at least one of said surface-perimeters;
   wherein the screen-display is configured at least vertically positionable to different heights before the large audience of a large-audience venue, wherein at least the exterior surface-perimeter of the screen-display comprises an array of pixel element displays substantially contiguous in appearance and providing a circumnavigably viewable display-surface viewing area equipped to exhibit at least segmented visual-media content and/or panoramic visual-media content extending up to 360 degrees, or less than 360 degrees.

40. The system of claim 39, further comprising video image processing means equipped for processing visual-media content for exhibition as the at least segmented visual-media content and/or panoramic visual-media content.

41. The system of claim 39, further comprising video image processing means equipped for processing visual-media content, wherein the visual-media content comprises at least live video and/or recorded video of HD video quality, or less than HD video quality; the panoramic visual-media content comprising a plurality of video image segments of the at least live and/or recorded video; and, the video image processing means further equipped to synchronize, render adjacently displayable and edge-match the plurality of video image segments in conformance with the size and shape of the display-surface viewing area, when exhibited for the large audience, and when extending up to the 360 degrees, or the less than 360 degrees.

42. The system of claim 39, wherein the exterior surface-perimeter of the screen-display comprises the array of pixel element displays, and the interior surface-perimeter equipped sufficiently opaque and contiguous in appearance, when vertically positioned above at least some of the large audience, for exhibition of visual-media content thereon, the visual media content provided from one or more of the following image-exhibiting apparatus: one or more projectors, a ring of projectors, an array of projectors, a plurality of imaging devices.

43. The large-audience, positionable imaging and display system of claim 39, wherein the screen-display is at least vertically-positionable to different heights before a large-audience and is three-dimensional shaped based on one of the following cross-sectional shapes: oval, elliptical, or polygonal.

44. A large-audience, positionable imaging and display system for the imaging and exhibition of visual-media content, comprising:
   a screen-display configured for the exhibition of panoramic imagery having an interior surface-perimeter and an exterior surface-perimeter, wherein each of said surface-perimeters is shaped and sized to be substantially contiguous in appearance and each of said surface-perimeters has a display-surface viewing area of a panoramic type, over a wide-angle field extending up to a full 360° of azimuth, on which, substantially contiguous panoramic visual-media content and segmented visual-media content can be imaged;
   at least one screen support means for supporting the shape of said screen-display;
   screen positioning means to position said screen-display to at least one height relative to a viewing audience to provide a multitude of vantage points from which to view at least one of said surface-perimeters;
   exhibition means for imaging and controlling said contiguous panoramic visual-media content and said segmented visual-media content on at least one of said surface-perimeters; and
   image-capturing means, wherein the image-capturing means comprising one or more video cameras, each one of the one or more video cameras configured to capture a field of view within the large-audience venue, wherein, each single field of view video-capture is configurable for exhibition on a portion of the exterior surface-perimeter and/or the interior surface-perimeter as a substantially-enlarged live exhibiting, or a recorded exhibiting, of the field of view; and wherein, a plurality of field of view video-captures of a plurality of video cameras is configurable for exhibition up to the entire surface area of the exterior surface-perimeter and/or the interior surface-perimeter as a substantially-enlarged live exhibiting, or a recorded exhibiting, of the plurality of field of view video-captures;
   wherein the positionable imaging and display system is located in a large-audience venue.

45. A large-audience, positionable imaging and display system for the imaging and exhibition of visual-media content, comprising:
   a screen-display configured for the exhibition of panoramic imagery having an interior surface-perimeter and an exterior surface-perimeter, wherein each of said surface-perimeters is shaped and sized to be substantially contiguous in appearance and each of said surface-perimeters has a display-surface viewing area of a panoramic type, over a wide-angle field extending up to a full 360° of azimuth, on which, substantially contiguous panoramic visual-media content and segmented visual-media content can be imaged;

at least one screen support means for supporting the shape of said screen-display;

screen positioning means to position said screen-display to at least one height relative to a viewing audience to provide a multitude of vantage points from which to view at least one of said surface-perimeters;

exhibition means for imaging and controlling said contiguous panoramic visual-media content and said segmented visual-media content on at least one of said surface-perimeters; and wherein the screen-display comprises an oval track format video game featuring a circularity of action and one or more controllable objects or sprites, wherein at least one of one or more controllable objects or sprites are configured responsive to input made from one or more control input apparatus of one or more audience attendees.

46. A large-audience, positionable imaging and display system for the imaging and exhibition of visual-media content, comprising:

a screen-display configured for the exhibition of panoramic imagery having an interior surface-perimeter and an exterior surface-perimeter, wherein each of said surface-perimeters is shaped and sized to be substantially contiguous in appearance and each of said surface-perimeters has a display-surface viewing area of a panoramic type, over a wide-angle field extending up to a full 360° of azimuth, on which, substantially contiguous panoramic visual-media content and segmented visual-media content can be imaged;

at least one screen support means for supporting the shape of said screen-display;

screen positioning means to position said screen-display to at least one height relative to a viewing audience to provide a multitude of vantage points from which to view at least one of said surface-perimeters; and exhibition means for imaging and controlling said contiguous panoramic visual-media content and said segmented visual-media content on at least one of said surface-perimeters;

wherein the exhibition means comprises a plurality of projectors, wherein at least two of the plurality of projectors are equipped to selectively project the same visual-media content on the same portion of at least one of the surface-perimeters, and wherein one of the two projectors is equipped as a redundant backup projector.

* * * * *